(12) United States Patent
Yamamoto et al.

(10) Patent No.: US 10,232,304 B2
(45) Date of Patent: *Mar. 19, 2019

(54) CARBON DIOXIDE CONCENTRATION CONTROL SYSTEM AND CARBON DIOXIDE CONCENTRATION CONTROL DEVICE

(71) Applicant: SHARP KABUSHIKI KAISHA, Sakai, Osaka (JP)

(72) Inventors: Masaki Yamamoto, Sakai (JP); Takayuki Naka, Sakai (JP); Hirohisa Yamada, Sakai (JP); Hideharu Tajima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/326,141

(22) PCT Filed: Jul. 21, 2015

(86) PCT No.: PCT/JP2015/070696
§ 371 (c)(1),
(2) Date: Jan. 13, 2017

(87) PCT Pub. No.: WO2016/027608
PCT Pub. Date: Feb. 25, 2016

(65) Prior Publication Data
US 2017/0197173 A1     Jul. 13, 2017

(30) Foreign Application Priority Data
Aug. 20, 2014   (JP) ................................ 2014-167854

(51) Int. Cl.
*B01D 53/14*   (2006.01)
*B01D 53/04*   (2006.01)
(Continued)

(52) U.S. Cl.
CPC ..... *B01D 53/0454* (2013.01); *B01D 53/0438* (2013.01); *B01D 53/30* (2013.01);
(Continued)

(58) Field of Classification Search
CPC ...................... B01D 53/0438; B01D 53/0454; B01D 53/30; B01D 2253/1124; B01D 2257/504;
(Continued)

(56) References Cited

U.S. PATENT DOCUMENTS 4,830,639 A    5/1989  Grunewald et al.
5,207,734 A *  5/1993  Day .................. B01D 53/9481
                                                      123/519

(Continued)

FOREIGN PATENT DOCUMENTS

JP    S61-227822 A    10/1986
JP    3-39729         6/1991
(Continued)

OTHER PUBLICATIONS

International Search Report for PCT/JP2015/070696 dated Oct. 27, 2015, 2 pages.
(Continued)

*Primary Examiner* — Frank M Lawrence, Jr.
(74) *Attorney, Agent, or Firm* — ScienBiziP, P.C.

(57) ABSTRACT

Consumed energy and cost relating to control of a carbon dioxide concentration is reduced. Each of $CO_2$ concentration control systems (100 to 105) includes a measuring unit (20) that measures a $CO_2$ concentration, a $CO_2$ absorption unit (30) that has a $CO_2$ absorption material (31) for absorbing $CO_2$ at a rate depending on the temperature thereof, and a control unit (10) that controls the temperature of the $CO_2$ absorption material (31) by using exhaust heat of a power system (40), so as to control a $CO_2$ absorption rate of the $CO_2$ absorption material (31).

5 Claims, 11 Drawing Sheets

(51) Int. Cl.
*F02G 5/02* (2006.01)
*B01D 53/30* (2006.01)
*B60H 3/06* (2006.01)
*F24F 110/70* (2018.01)

(52) U.S. Cl.
CPC ......... *B60H 3/0608* (2013.01); *B60H 3/0633* (2013.01); *F02G 5/02* (2013.01); *B01D 2251/302* (2013.01); *B01D 2253/1124* (2013.01); *B01D 2257/504* (2013.01); *B01D 2258/06* (2013.01); *B01D 2259/40098* (2013.01); *B01D 2259/4566* (2013.01); *B60H 2003/0683* (2013.01); *B60H 2003/0691* (2013.01); *F24F 2110/70* (2018.01); *Y02C 10/06* (2013.01); *Y02C 10/08* (2013.01)

(58) Field of Classification Search
CPC .. B01D 2259/40098; B01D 2259/4566; B60H 3/0608; B60H 2003/0691; F02G 5/02
USPC ................ 96/111, 244; 95/8, 139, 227, 236; 423/220, 230
See application file for complete search history.

(56) References Cited

U.S. PATENT DOCUMENTS

| | | | |
|---|---|---|---|
| 5,292,123 A | 3/1994 | Schmidt, Jr. et al. | |
| 5,542,665 A | 8/1996 | Levocz et al. | |
| 5,716,287 A | 2/1998 | Levocz et al. | |
| 5,746,664 A | 5/1998 | Reynolds, Jr. | |
| 5,863,257 A | 1/1999 | Busnardo | |
| 5,997,409 A | 12/1999 | Mattson | |
| 6,641,487 B1 | 12/2003 | Hamburger | |
| 6,783,738 B1 | 8/2004 | Sasaki et al. | |
| 9,381,491 B2 * | 7/2016 | Yang | C01B 32/40 |
| 10,005,019 B2 * | 6/2018 | Yamamoto et al. | B01D 53/02 96/111 |
| 2002/0134234 A1 * | 9/2002 | Kalbassi | B01D 53/0462 95/11 |
| 2002/0194990 A1 | 12/2002 | Wegeng et al. | |
| 2003/0015093 A1 | 1/2003 | Wegeng et al. | |
| 2003/0050131 A1 | 3/2003 | Grace | |
| 2004/0023086 A1 | 2/2004 | Su et al. | |
| 2006/0037478 A1 | 2/2006 | Mori et al. | |
| 2006/0144227 A1 | 6/2006 | White et al. | |
| 2006/0230930 A1 | 10/2006 | Knaebel | |
| 2010/0319531 A1 | 12/2010 | Iijima et al. | |
| 2011/0265648 A1 | 11/2011 | Meirav | |
| 2011/0296872 A1 | 12/2011 | Eisenberger | |
| 2012/0048111 A1 | 3/2012 | Nakao et al. | |
| 2012/0067219 A1 | 3/2012 | Ogawa et al. | |
| 2012/0235087 A1 | 9/2012 | Handagama et al. | |
| 2012/0324931 A1 | 12/2012 | Alden et al. | |
| 2013/0283842 A1 | 10/2013 | Heyse et al. | |
| 2013/0298532 A1 * | 11/2013 | Hamad | B01D 53/0462 60/274 |
| 2014/0076165 A1 | 3/2014 | Nakayama et al. | |
| 2016/0354722 A1 * | 12/2016 | Yamamoto | B01J 20/10 |
| 2017/0087963 A1 * | 3/2017 | Tajima | B60H 3/06 |

FOREIGN PATENT DOCUMENTS

| | | |
|---|---|---|
| JP | H03-078563 U | 8/1991 |
| JP | 2001-317780 | 11/2001 |
| JP | 2003-194378 | 7/2003 |
| JP | 2006-103974 A | 4/2006 |
| JP | 2008-030694 | 2/2008 |
| JP | 2009-190007 | 8/2009 |
| JP | 2010-032092 A | 2/2010 |
| JP | 2010-243104 | 10/2010 |
| JP | 2013-022577 | 2/2013 |

OTHER PUBLICATIONS

Non-Final Office Action for U.S. Appl. No. 10/005,019, dated Aug. 24, 2004, pp. 3-7, USPTO.

Non-Final Office Action for U.S. Appl. No. 15/109,905, now U.S. Pat. No. 10,005,019, dated Jan. 5, 2018.

Japanese Office Action and English translation thereof dated Jan. 24, 2017 in JP Application 2016-503936.

Shigeniwa et al, "Study of Carbon Dioxide Collection Process Using Ceramics Absorbing Material", The Society of Chemical Engineers, Japan (SCEJ) Lecture Proceedings, Aug. 18, 2003, SCEJ 36th Autumn Meeting, Session ID: G3A02 (A concise explanation of the relevance can be found in NPL1 submitted herewith).

* cited by examiner

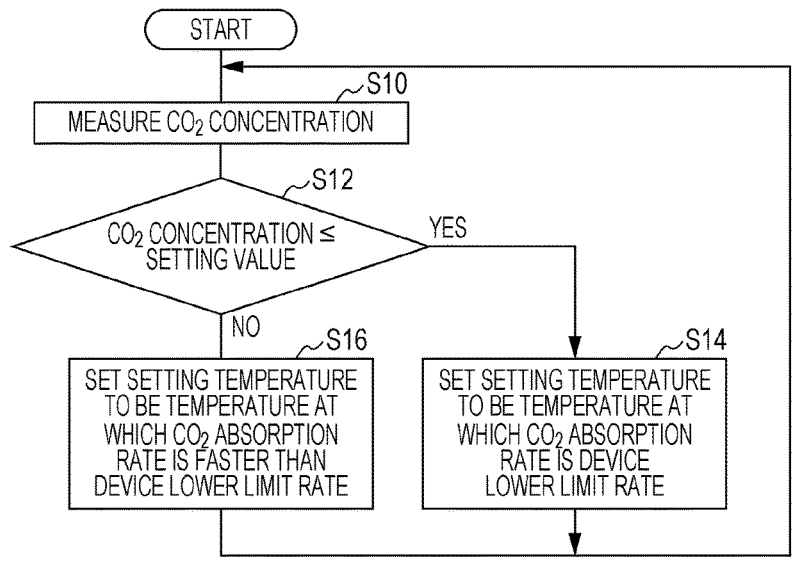

CARBON DIOXIDE CONCENTRATION CONTROL SYSTEM AND CARBON DIOXIDE CONCENTRATION CONTROL DEVICE

This application is the U.S. national phase of International Application No. PCT/JP2015/070696 filed Jul. 21, 2015 which designated the U.S. and claims priority to JP Patent Application No. 2014-167854 filed Aug. 20, 2014, the entire contents of each of which are hereby incorporated by reference.

TECHNICAL FIELD

The present invention relates to a carbon dioxide concentration control system and the like that control a carbon dioxide concentration.

BACKGROUND ART

From a viewpoint of efficient use of an air conditioner, which is caused by the problem of environmental pollution or an increase of power saving tastes, a need for restricting ventilation in a room has recently grown. In such a case where ventilation is restricted in a space in which restriction of the ventilation is possible, respiration of a person causes a decrease of an oxygen concentration and an increase of a carbon dioxide concentration in an air.

Here, particularly, it is important to maintain the carbon dioxide concentration to be an adequate value in a space in which a person exists. This is because a rate at which the carbon dioxide concentration in the air increases up to a value harmful to a human body is faster than a rate at which the oxygen concentration decreases up to a value harmful to the human body in a space in which ventilation is restricted.

For example, in a case where one person exists in a vehicle in which ventilation is restricted, a period when the oxygen concentration decreases from a value (about 21%) thereof in the air to a value (18%) stated as limit for safety is about 5 hours. However, a period when the carbon dioxide concentration increases from a value (about 400 ppm) thereof in the air to a value (3000 ppm) stated as that health may be adversely affected is about 30 minutes. That is, the period when the carbon dioxide concentration increases is significantly short.

Thus, it is important to suppress an increase of the carbon dioxide concentration in a space where a person exists. A technology of removing carbon dioxide in the air has been developed in order to suppress the increase of the carbon dioxide concentration. For example, PTL 1 discloses a technology in which carbon dioxide in an air is absorbed and removed by using an absorbent which has an amine-based organic substance attached thereto. PTL 2 discloses a technology in which carbon dioxide in an air is absorbed and removed by using activated carbon.

CITATION LIST

Patent Literature

PTL 1: Japanese Examined Patent Application Publication No. 3-39729 (Published on Jun. 14, 1991)
PTL 2: Japanese Unexamined Patent Application Publication No. 2001-317780 (Published on Nov. 16, 2001)

SUMMARY OF INVENTION

Technical Problem

However, in the above related art, adjusting an amount of absorbed carbon dioxide is impossible or difficult. Thus, controlling the carbon dioxide concentration in an air to be an appropriate value is difficult.

Specifically, in a case where an adhering material disclosed in PTL 1 or the activated carbon disclosed in PTL 2 is used as carbon dioxide absorption material, adjusting an amount of carbon dioxide to be absorbed per unit time (absorption rate) in the absorption material itself is not possible. Thus, even in a case where the carbon dioxide concentration in a space has an appropriate value, carbon dioxide may be unnecessarily absorbed.

To solve the above problem, using an absorption material of enabling control of an absorption rate of carbon dioxide is considered. However, in a case of using the absorption material of enabling control of an absorption rate of carbon dioxide, energy for controlling the absorption rate is separately required.

For example, in a case where the temperature of the absorption material is controlled so as to control the absorption rate of carbon dioxide, energy for heating the absorption material is required. Thus, consumed energy per control of the carbon dioxide concentration may be increased. In addition, regarding a device, a component, or the like for generating the above energy, the number of required components may be increased.

Considering the above problems, an object of the present invention is to realize reduction of consumed energy which relates to control of the carbon dioxide concentration, and to realize suppression of cost in the entirety of a system which relates to the control.

Solution to Problem

To solve the above problem, according to an aspect of the present invention, there is provided a carbon dioxide concentration control system which includes a detection unit that detects a carbon dioxide concentration in an air in a predetermined space, an absorption unit that includes an absorption material for absorbing carbon dioxide contained in the air and is configured to enable control of a carbon dioxide absorption rate of the absorption material in accordance with a temperature of the absorption material, and an absorption rate control unit that controls the temperature of the absorption material in accordance with the carbon dioxide concentration detected by the detection unit, so as to control the carbon dioxide absorption rate of the absorption material. The absorption rate control unit controls the temperature of the absorption material by using exhaust heat generated in a power system which is at least one of an energy source and a power source used in the predetermined space and/or an object related to the predetermined space.

To solve the above problem, according to another aspect of the present invention, there is provided a carbon dioxide concentration control device which includes a detection unit that detects a carbon dioxide concentration in an air in a predetermined space, an absorption unit that includes an absorption material for absorbing carbon dioxide contained in the air and is configured to enable control of a carbon dioxide absorption rate of the absorption material in accordance with a temperature of the absorption material, and an absorption rate control unit that controls the temperature of the absorption material in accordance with the carbon dioxide concentration detected by the detection unit, so as to control the carbon dioxide absorption rate of the absorption material. The absorption rate control unit controls the temperature of the absorption material by using exhaust heat generated in a power system.

Advantageous Effects of Invention

According to an aspect of the present invention, there are advantages in that it is possible to realize reduction of consumed energy which relates to control of the carbon dioxide concentration, and to realize suppression of cost in the entirety of a system which relates to the control.

BRIEF DESCRIPTION OF DRAWINGS

FIG. 4 is a flowchart illustrating an example of processing in which a $CO_2$ concentration control device controls a $CO_2$ concentration in the carbon dioxide concentration control system.

FIG. 5 is a table illustrating a relationship between the $CO_2$ concentration, a setting value, and a setting temperature of a $CO_2$ absorption material in the $CO_2$ concentration control device.

DESCRIPTION OF EMBODIMENTS

Embodiment 1

A first embodiment of the present invention will be described as follows. Firstly, a configuration of a $CO_2$ concentration control system 100 according to this embodiment will be described with reference to FIG. 1.

$CO_2$ Concentration Control System

Figure 1:
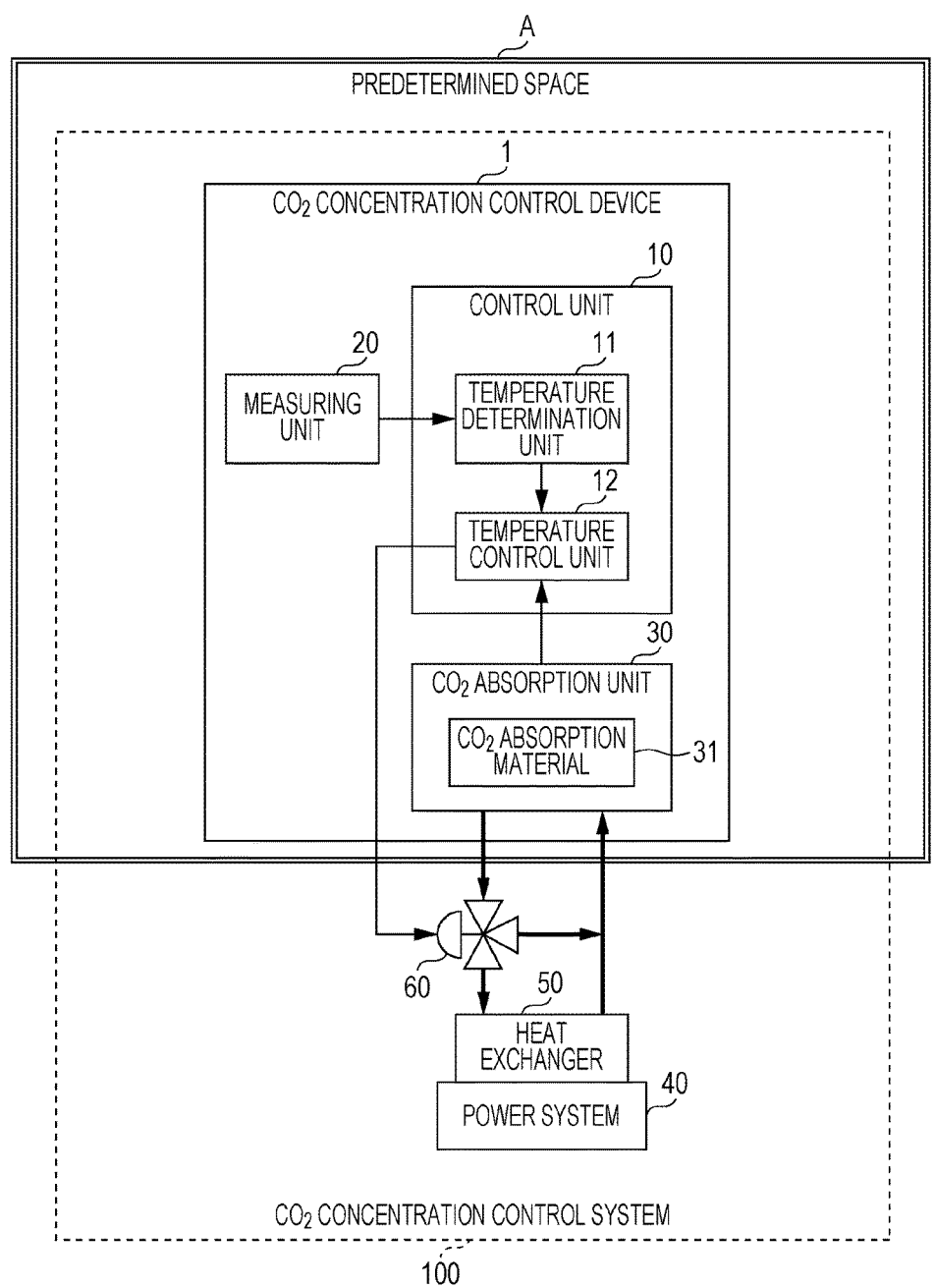
FIG. 1 is a diagram illustrating a configuration of a carbon dioxide ($CO_2$) concentration control system according to Embodiment 1 of the present invention.

FIG. 1 is a diagram illustrating a configuration of the $CO_2$ concentration control system 100 according to this embodiment. The $CO_2$ concentration control system 100 includes a $CO_2$ concentration control device (carbon dioxide concentration control device) 1, a power system 40, a heat exchanger 50, and a flow rate control valve 60. A bold arrow in FIG. 1 indicates a flow of a thermal medium which will be described later. The flow of the thermal medium is indicated below by a bold arrow. A part surrounded by a double line in FIG. 1 indicates a predetermined space A.

The heat exchanger 50 is provided so as to be in contact with the power system 40 or to be close to the power system 40, as illustrated in FIG. 1. A. A flow path for a thermal medium is configured between the $CO_2$ absorption unit 30 of the $CO_2$ concentration control device 1 and the heat exchanger 50, so as to circulate the thermal medium (for example, oil for high temperature). The flow rate control valve 60 is provided on the flow path.

Predetermined Space A

The predetermined space A is a space as a target in which the $CO_2$ concentration control device 1 controls a $CO_2$ concentration. The predetermined space A may be any space as long as an air exists in the space. Examples of the space include a living space of a house, a working space of a factory, an office, or the like, and a space in transportation such as a car, a train, an airplane, and a ship.

Particularly, it is desirable that the predetermined space A is a space in which restriction of ventilation is possible. Here, "the space in which restriction of ventilation is possible" means a closed space, an indoor space (interior space) in which restriction of ventilation is possible, or a space in transportation. In addition, "the space in which restriction of ventilation is possible" may be reworded as a space in which automatic ventilation (opening a window, operating a ventilating fan, operating a device of performing ventilation, causing the pressure of a vacuum device to be negative, and the like) can be restricted or prohibited.

Power System 40

The power system 40 is a system in which exhaust heat is generated. In this embodiment, the power system 40 is referred to as "a power system" for a convenience. However, the power system 40 may be any system as long as the system generates exhaust heat usable by the $CO_2$ concentration control device 1. The exhaust heat generated from the power system 40 also includes exhaust heat from a radiator which functions as the power system 40 or is attached to the power system 40.

Further, the power system 40 is desirably a system functioning as at least one of an energy source and a power source which is used in the predetermined space A and/or an object related to the predetermined space A. Here, the object related to the predetermined space A may be a space or an object relating to the predetermined space. For example, if the predetermined space is defined to a certain room of a house, the object related to the predetermined space A may be another room in the house or be water supplied to the house. For example, if the predetermined space is defined to a specific space in a building, the object related to the predetermined space may be a space other than the specific space in the building or be water supplied to the building. For example, "the system used in the predetermined space A and/or an object related to the predetermined space A" means a system acting on the predetermined space A and/or the object related to the predetermined space A or on a specific target of forming the predetermined space A and/or the object related to the predetermined space A.

The power system 40 is a system that generates at least one of power and energy used for a purpose except for operating the $CO_2$ concentration control system 100 for the predetermined space A and/or the object related to the predetermined space A or for a target of including the predetermined space A and/or the object related to the predetermined space A. The power system 40 is desirably a system which is provided in the $CO_2$ concentration control system 100 in advance.

Here, "the power system 40 that generates power" is a system that generates kinetic energy for the predetermined space A and/or for driving the object related to the predetermined space A, and generates exhaust heat when the kinetic energy is generated. In the following descriptions, the predetermined space A will be representatively described. Specifically, the power system 40 is, for example, an engine (for example, gasoline engine) or a motor (for example, electric motor) for driving transportation which includes the predetermined space A.

It is stated that kinetic energy for driving the vehicle is about ⅓, and about ⅔ of the remaining is thermal loss (the thermal loss is roughly classified into thermal loss by a discharged gas and cooling loss for a coolant) in energy obtained by combusting fuel in a gasoline engine of a vehicle.

The "power system 40 that generates power" functions as a source that generates energy, or converts the acquired energy into energy of a desired form. The "power system 40 that generates power" generates heat (exhaust heat) which is not used for the above purpose when the energy is generated (or converted). Specifically, the power system 40 may be, for example, a power generator which supplies electricity to a predetermined space A or be a compressor of an air conditioner which is installed in order to adjust the temperature of an air in the predetermined space A.

The power system 40 may pass the exhaust heat (or oil including exhaust heat, thermal medium such as an exhaust gas) which is generated by a device (not illustrated) acting on the predetermined space A and/or a specific target of forming an object related to the predetermined space A, or may accumulate the generated exhaust heat. Specifically, the power system 40 may be a pipe for discharging an exhaust gas which has generated by the device, oil, water, or the like which has a high temperature by exhaust heat of the above device. In addition, the power system 40 may be a wasted-water tank and the like in which the discharged matters are accumulated.

Heat Exchanger 50

The heat exchanger 50 causes a thermal medium to acquire thermal energy of exhaust heat generated by the power system 40 (or included in the power system 40) (moves the heat). The heat exchanger 50 will be described below with reference to FIG. 2.

Figure 2:
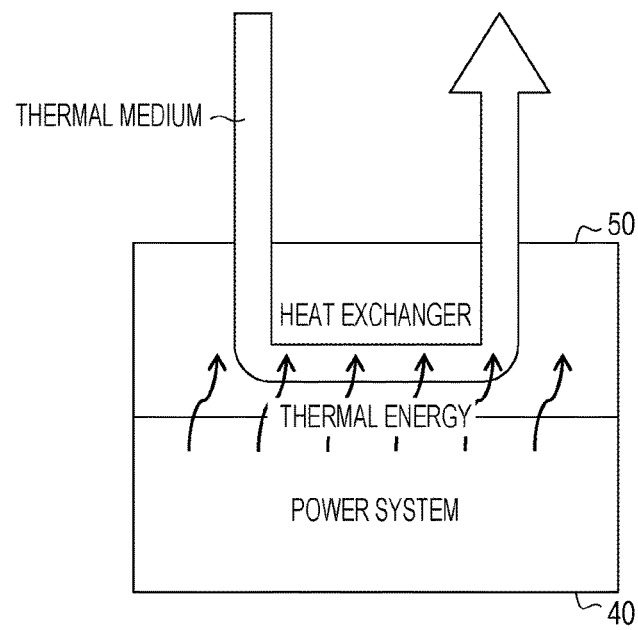
FIG. 2 is a diagram illustrating an example of a structure of a heat exchanger included in the $CO_2$ concentration control system.

FIG. 2 is a diagram illustrating an example of a structure of the heat exchanger 50. As illustrated in FIG. 2, the heat exchanger 50 has a pipe and the like which passes through the inside thereof, and thus a thermal medium flows in the heat exchanger 50. The thermal medium flowing into the heat exchanger 50 transfers thermal energy of exhaust heat generated by the power system 40 (or exhaust heat of a substance which passes through the power system 40 and is accumulated in the power system 40), and flows toward the outside of the heat exchanger 50 along the flow path. As described above, the thermal medium passes in the heat exchanger 50, and thus absorbs heat of the power system 40.

Thermal energy absorbed by the thermal medium in the heat exchanger 50 also includes heat generated from a radiator of the power system 40.

Flow Rate Control Valve 60

The flow rate control valve 60 adjusts a flow rate of a thermal medium supplied to the heat exchanger 50, and a flow rate of a thermal medium which is not supplied to the heat exchanger 50, in accordance with a control command from the $CO_2$ concentration control device 1. The thermal medium supplied to the heat exchanger 50 is heated by passing through the heat exchanger 50, and then flows into the $CO_2$ absorption unit 30 of the $CO_2$ concentration control device 1. The thermal medium which is not supplied to the heat exchanger 50 flows into the $CO_2$ absorption unit 30 as it is, without passing through the heat exchanger 50, as illustrated in FIG. 2. Thus, the flow rate control valve 60 adjusts the flow rate of the thermal medium, and thus, it is possible to adjust the temperature of the thermal medium flowing into the $CO_2$ absorption unit 30.

$CO_2$ Concentration Control Device 1

The $CO_2$ concentration control device 1 is a device that controls the $CO_2$ absorption rate of the $CO_2$ absorption material 31 (which will be described later) by using the exhaust heat of the power system 40, so as to control the $CO_2$ concentration in a predetermined space A. The $CO_2$ concentration control device 1 includes a control unit (absorption rate control unit) 10, a measuring unit (detection unit) 20, and a $CO_2$ absorption unit (absorption unit) 30.

The $CO_2$ concentration control device 1 controls carbon dioxide concentration ($CO_2$ concentration) of an air in a predetermined space (simply referred to as an air below) so as to cause the $CO_2$ concentration to have an appropriate value. The $CO_2$ concentration control device 1 takes an air, removes (absorbs) carbon dioxide of an amount depending on the $CO_2$ concentration of the air, and discharges an air after $CO_2$ is removed, to the outside of the device.

The $CO_2$ concentration control device 1 desirably includes, for example, a mechanism (not illustrated) of taking an air, such as a fan. The $CO_2$ concentration control device 1 includes a fan and the like, and thus can deliver an air to the $CO_2$ absorption unit 30 (which will be described later) faster and efficiently. In addition, it is possible to circulate the air after the $CO_2$ absorption unit 30 absorbs carbon dioxide, to the predetermined space A faster and efficiently. Thus, it is possible to more accurately measure the $CO_2$ concentration of an air in a space, and to more efficiently circulate the air in the predetermined space A. Accordingly, the $CO_2$ concentration control device 1 can more delicately control the $CO_2$ concentration of a space.

The measuring unit 20 measures (detects) the $CO_2$ concentration of an air in the predetermined space A at a predetermined time interval. The measuring unit 20 transmits the measured $CO_2$ concentration to the temperature determination unit (which will be described later) 11.

The time interval may be set in advance, or may be freely set by a user. The time interval at which the measuring unit 20 performs measurement becomes shorter, and thus there are advantages in that the absorption rate of the $CO_2$ absorption unit 30 which will be described later can be controlled more delicately, and the carbon dioxide concentration in a space can be controlled more precisely.

The measuring unit 20 may measure the $CO_2$ concentration of an air before the $CO_2$ absorption unit 30 which will be described later absorbs carbon dioxide (air before removal of $CO_2$) or may measure the carbon dioxide concentration of an air after carbon dioxide is absorbed (air after removal of $CO_2$). The measuring unit 20 may be provided in the $CO_2$ concentration control device 1, and may measure the carbon dioxide concentration of an air taken into the $CO_2$ concentration control device 1. The measuring unit 20 may be provided on the outside of the $CO_2$ concentration control device 1 (in the predetermined space A), and may directly measure the $CO_2$ concentration of an air in the predetermined space A.

A measuring method of the $CO_2$ concentration by the measuring unit 20 is not particularly limited. Examples of the measuring method include a semiconductor type, an electro-chemical type, and an infrared absorptive type.

In a case where the $CO_2$ concentration is measured by using the semiconductor type, an n-type semiconductor such as $SnO_2$ and ZnO may be used as the semiconductor. Among the substances, a semiconductor obtained by adding La to $SnO_2$ is excellent in selectivity of carbon dioxide. Thus, in a case where the $CO_2$ concentration is measured by using the semiconductor type, it is more desirable that a semiconductor obtained by adding lanthanum (La) to $SnO_2$ is used in the present invention. In a case where the $CO_2$ concentration is detected by using the electro-chemical type, a sodium ion conductor may be used as a type of a conductive ion of a solid electrolyte.

In the above detection method, the semiconductor type has an advantage in that variation of detection accuracy of carbon dioxide occurring by an environmental condition occurs less frequently, and thus the $CO_2$ concentration can be detected even under a severe environment, in addition to cheap cost. The electro-chemical type and the infrared absorptive type have an advantage in that detection accuracy of carbon dioxide is improved, and selectivity of carbon dioxide is excellent.

The $CO_2$ absorption unit 30 has a $CO_2$ absorption material (absorption material) 31 for absorbing carbon dioxide in an air, and causes the $CO_2$ absorption material 31 to absorb carbon dioxide. The $CO_2$ absorption unit 30 includes a temperature sensor (not illustrated) in the vicinity of the $CO_2$ absorption material 31. The temperature sensor measures the temperature of the $CO_2$ absorption material 31. The temperature sensor is connected to the temperature control unit 12 (which will be described later) so as to enable communication. The $CO_2$ absorption unit 30 may be provided in the predetermined space A as illustrated in FIG. 1, or be provided on the outside of the predetermined space A.

The $CO_2$ absorption material 31 is an absorption material which can control an amount of absorbable carbon dioxide per unit time, in accordance with the temperature change thereof. That is, the $CO_2$ absorption material 31 is an absorption material that can control the absorption rate of carbon dioxide ($CO_2$ absorption rate). It is more preferable that the $CO_2$ absorption material 31 is an absorption material which can control the $CO_2$ absorption rate from about 0 (absorption rate as small as not influencing the $CO_2$ concentration in the space even though carbon dioxide is absorbed at this rate).

Here, the temperature is a parameter which can be relatively simply and accurately measured and controlled. Thus, it is possible to simply and accurately control the $CO_2$ absorption rate by using the $CO_2$ absorption material 31 which can control the $CO_2$ absorption rate depending on the temperature. Examples of a substance which can control the $CO_2$ absorption rate in accordance with a control of the temperature include lithium composite oxide such as $Li_2ZrO_3$, $LiFeO_2$, $LiNiO_2$, $Li_2TiO_3$, $Li_2SiO_3$, and $Li_4SiO_4$.

Temperature of Lithium Composite Oxide and Carbon Dioxide Absorption Rate

Figure 3:
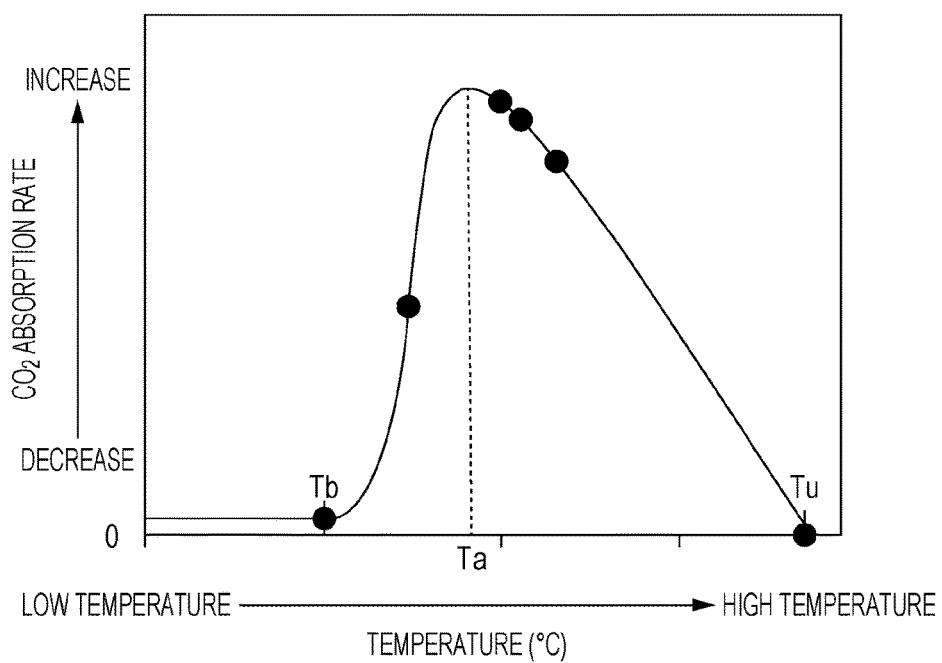
FIG. 3 is a graph illustrating an example of a relationship between the temperature of lithium composite oxide and a $CO_2$ absorption rate.

Here, a relationship between the temperature of the lithium composite oxide and the $CO_2$ absorption rate will be described in detail with reference to FIG. 3. FIG. 3 is a graph illustrating an example of the relationship between the temperature of the lithium composite oxide and the $CO_2$ absorption rate. The temperature of the lithium composite oxide when the $CO_2$ absorption rate of the lithium composite oxide is the maximum is set as Ta. Ta is a temperature higher than at least room temperature.

As illustrated in FIG. 3, in a case where the temperature of the lithium composite oxide is equal to or lower than Tb, the $CO_2$ absorption rate of the lithium composite oxide hardly varies. In other words, the lithium composite oxide has substantially the minimum $CO_2$ absorption rate until the temperature reaches the temperature Tb.

The $CO_2$ absorption rate of the lithium composite oxide is increased with an increase of the temperature, in a range in which the temperature of the lithium composite oxide is higher than Tb and is equal to or lower than Ta. Further, if the temperature of the lithium composite oxide is higher than Ta, the $CO_2$ absorption rate of the lithium composite oxide is decreased with an increase of the temperature. The $CO_2$ absorption rate of the lithium composite oxide becomes substantially the minimum $CO_2$ absorption rate again at the temperature Tu.

As described above, the lithium composite oxide is a carbon dioxide absorption material which can control the $CO_2$ absorption rate in accordance with the temperature thereof. Thus, the lithium composite oxide can be appropriately used as the $CO_2$ absorption material 31. In the following descriptions, as an example, a case where lithium composite oxide having a relationship between the temperature and the $CO_2$ absorption rate as illustrated in FIG. 3, or a substance containing the lithium composite oxide is used as the $CO_2$ absorption material 31 will be described.

It is desirable that the $CO_2$ absorption material 31 is an absorption material which can selectively absorb only carbon dioxide. The above-described lithium composite oxide is an absorption material which can selectively absorb only carbon dioxide, and thus is appropriate as the $CO_2$ absorption material 31.

In the related art, a technology in which carbon dioxide is separated by using a $CO_2/O_2$ selective film, and an absorption material absorbs the separated carbon dioxide is provided. However, the $CO_2/O_2$ selective film has no selectivity for a substance of which a large amount exists in an air, other than carbon dioxide and oxygen. Thus, when carbon dioxide is separated, nitrogen of an amount which is much more than carbon dioxide may be contained in gas obtained by the separation. Thus, in a case where ventilation is restricted in a space in which restriction of ventilation is possible, if separation and removal of carbon dioxide continues, air pressure in the space may be significantly reduced. Accordingly, maintaining the carbon dioxide concentration in the space to be constant for a long term is difficult even though the $CO_2/O_2$ selective film is used as in the related art.

In the present invention, in a case of using an absorption material which can selectively absorb only carbon dioxide is used as the $CO_2$ absorption material 31, it is possible to efficiently absorb only carbon dioxide without absorbing a substance of which the much amount is contained in an air.

Thus, as described above, there is an advantage in that the air pressure in the space does not significantly change and relatively dropping absorption capability of carbon dioxide is difficult.

The $CO_2$ absorption material for absorbing carbon dioxide in an exhaust gas is also conventionally provided. However, since the exhaust gas is significantly high temperature and high pressure, the $CO_2$ absorption material for absorbing carbon dioxide from an exhaust gas is defined to absorb carbon dioxide under conditions of high temperature and high pressure.

On the contrary, if lithium composite oxide is used as the $CO_2$ absorption material 31, carbon dioxide can be absorbed and emitted under conditions of the vicinity of a normal temperature (room temperature) and the vicinity of normal pressure (atmospheric pressure) in a space in which a person exists. That is, the lithium composite oxide material is used as the material of the absorption material, and thus an effect in that the carbon dioxide concentration can be controlled in a space in which a person may exist is exhibited.

In the related art, a technology of reducing the $CO_2$ concentration in a specific space (space of which the $CO_2$ concentration is increased by existence of a person (activity such as respiration of a person)) by using a selective separation material which penetrates carbon dioxide from a side of high concentration toward a side of low concentration is provided.

However, for example, in a case where the specific space is a space in a tunnel, the $CO_2$ concentration out of the space is higher than the $CO_2$ concentration in the space. In this case, if the selective separation material is used, there is a problem in that the $CO_2$ concentration in the space is increased regardless of that the $CO_2$ concentration in the space does not have an appropriate value (for example, a value harmful to a human body).

Further, a control method of the $CO_2$ concentration by using the selective separation material uses a difference between the $CO_2$ concentrations in the specific space and out of the specific space. Thus, control of the $CO_2$ concentration out of the space is not possible. Thus, controlling the $CO_2$ concentration in the specific space to have a specific value (or a value in a specific range) may be not possible.

On the contrary, in the carbon dioxide control system according to the present invention, the lithium composite oxide material is used, and thus an effect in that the $CO_2$ concentration in the specific space (predetermined space A) can be controlled to have an appropriate value is exhibited.

The control unit 10 collectively controls the $CO_2$ concentration control device 1. Specifically, the control unit 10 may be realized by a logical circuit (hardware) formed on an integrated circuit (IC chip) and the like, by software using a central processing unit (CPU), or the like.

The control unit 10 includes a temperature determination unit 11 and a temperature control unit 12. The control unit 10 may instruct the measuring unit 20 to detect the $CO_2$ concentration at a predetermined time interval.

The temperature determination unit 11 determines the temperature of the $CO_2$ absorption material (lithium composite oxide) 31, in accordance with the $CO_2$ concentration received from the measuring unit 20. The temperature determination unit 11 determines whether or not the $CO_2$ concentration is equal to or less than a setting value, if the $CO_2$ concentration in an air is received from the measuring unit 20.

Here, "the setting value" is an upper limit value of the $CO_2$ concentration, which is considered as being appropriate in the predetermined space A. The "setting value" is desirably set to about 1000 ppm. This is because it is known that the $CO_2$ concentration in an air on the outside of a house is generally about 400 ppm, and, if the $CO_2$ concentration is more than 1000 ppm, a person feels sleepy and concentration of the person is degraded. In addition, this is because a standard value of the $CO_2$ concentration is also set to 1000 ppm in the Building Sanitation Act and the like. Further, this is because it is known that, in a case where the $CO_2$ concentration in an air exceeds 1000 ppm, and continuously increases, damage to health is increased depending on the increase of the $CO_2$ concentration.

The setting value may be a value which is preset when a product is shipped, or be a value which can be freely set and changed by a user of the $CO_2$ concentration control device 1.

In a case where the $CO_2$ concentration in an air is equal to or less than the setting value, the temperature determination unit 11 determines a setting temperature to be a temperature at which the $CO_2$ absorption rate of the absorption material is a lower limit rate which can be set by the $CO_2$ concentration control device 1. In a case where the $CO_2$ concentration measured by the measuring unit 20 is more than the setting value, the temperature determination unit 11 determines the setting temperature to be a temperature at which the $CO_2$ absorption rate of the $CO_2$ absorption material 31 is more than the lower limit rate (for example, a value which is higher than the temperature Tb and is equal to or lower than the temperature Tu in FIG. 3). If the temperature determination unit 11 determines the setting temperature of the $CO_2$ absorption material 31, the temperature determination unit 11 notifies the temperature control unit 12 of the determined temperature.

The "lower limit rate which can be set by the $CO_2$ concentration control device 1" means at least a rate slower than the fastest $CO_2$ absorption rate of the $CO_2$ absorption material 31, and means substantially the minimum $CO_2$ absorption rate which can be set by the $CO_2$ concentration control device 1. The "lower limit rate which can be set by the $CO_2$ concentration control device 1" is simply referred below to as "a device lower limit rate". The "device lower limit rate" is, for example, a value which causes the $CO_2$ absorption rate of the $CO_2$ absorption material 31 to be slowest in a range of a temperature which can be controlled by the temperature control unit 12.

The temperature control unit 12 controls the temperature of the $CO_2$ absorption material 31 to be a temperature determined by the temperature determination unit 11. As described above, the $CO_2$ absorption material 31 is an absorption material of changing the $CO_2$ absorption rate depending on the change of the temperature. Thus, the temperature control unit 12 controls the temperature of the $CO_2$ absorption material 31, and thus can control the $CO_2$ absorption rate of the $CO_2$ absorption material 31.

The temperature control unit 12 receives a temperature (actually-measured temperature) of the $CO_2$ absorption material 31, which has been measured by the temperature sensor of the $CO_2$ absorption unit 30, from the $CO_2$ absorption unit 30 at a predetermined time interval. The temperature control unit 12 receives a temperature (setting temperature) of the $CO_2$ absorption material 31, which has been determined by the temperature determination unit 11, from the temperature determination unit 11.

The temperature control unit 12 compares the actually-measured temperature and the setting temperature to each other, and determines temperature control of the $CO_2$ absorption unit 30 in accordance with a result of the comparison. In a case where the actually-measured temperature is higher than the setting temperature, the temperature control unit 12 lowers the temperature of the $CO_2$ absorption material 31. In a case where the actually-measured temperature is lower than the setting temperature, the temperature control unit 12 rises the temperature of the $CO_2$ absorption material 31. In a case where the actually-measured temperature is equal to the setting temperature, the temperature control unit 12 may set the change of the temperature of the $CO_2$ absorption material 31 to be the minimum value. That is, the temperature control unit 12 may hold the temperature of the $CO_2$ absorption material 31.

The temperature control unit 12 in this embodiment adjusts the heat quantity which is acquired from a thermal medium by the $CO_2$ absorption unit 30, and thus controls the temperature of the $CO_2$ absorption material 31. That is, the temperature control unit 12 controls the flow rate control valve 60 in accordance with the setting temperature determined by the temperature determination unit 11 and the measured temperature by measuring of the $CO_2$ absorption unit 30. Thus, as a result, the temperature control unit 12 controls the heat quantity transferred to a thermal medium in the heat exchanger 50. In other words, the temperature control unit 12 controls the flow rate control valve 60, and thus indirectly controls the temperature of the $CO_2$ absorption material 31.

More specifically, in a case where the setting temperature determined by the temperature determination unit 11 is higher than the measured temperature of the $CO_2$ absorption material 31, the temperature control unit 12 instructs the flow rate control valve 60 to increase a flow rate of the thermal medium toward the heat exchanger 50, in order to rise the temperature of the $CO_2$ absorption material 31. In a case where the setting temperature determined by the temperature determination unit 11 is lower than the measured temperature of the $CO_2$ absorption material 31, the temperature control unit 12 instructs the flow rate control valve 60 to decrease the flow rate of the thermal medium toward the heat exchanger 50, in order to lower the temperature of the $CO_2$ absorption material 31.

The temperature determination unit 11 may determine the surrounding temperature of the $CO_2$ absorption material 31. The temperature control unit 12 may also control the surrounding temperature of the $CO_2$ absorption material 31, in addition to control of the temperature of the $CO_2$ absorption material 31 itself.

For example, the temperature sensor of the $CO_2$ absorption unit 30 may measure the temperature of the surrounding space of the $CO_2$ absorption material 31 (that is, in the $CO_2$ absorption unit 30) in addition to the temperature of the $CO_2$ absorption material 31. The temperature determination unit 11 may determine the temperature of the $CO_2$ absorption unit 30 in addition to the temperature of the $CO_2$ absorption material 31. The temperature control unit 12 may control the temperature of the $CO_2$ absorption unit 30. As described above, since the $CO_2$ absorption material 31 is included in the $CO_2$ absorption unit 30, the temperature of the $CO_2$ absorption unit 30 is controlled, and thus it is possible to indirectly control the temperature of the $CO_2$ absorption material 31.

A temperature sensor (not illustrated) may be provided on the flow path of a thermal medium, and the temperature sensor may be connected so as to enable communication with the temperature control unit 12. In this case, the temperature control unit 12 can monitor the temperature of the thermal medium in addition to the measured temperature of the $CO_2$ absorption material 31, which is received from the $CO_2$ absorption unit 30. Accordingly, it is possible to control the temperature of the $CO_2$ absorption material 31 with more accuracy.

Examples of Predetermined Space A and Power System 40

The predetermined space A is preferably an interior of transportation. In a general transportation, a device (power system 40) which generates at least one of power and energy for driving the transportation is positioned at a location close to the interior (that is, $CO_2$ absorption unit 30) of the transportation. Thus, when the temperature of the $CO_2$ absorption unit 30 is controlled by using exhaust heat obtained when at least one of energy and power is generated, an effect in that the temperature of the $CO_2$ absorption material 31 can be controlled in a state of small thermal loss, that is, with high energy use efficiency is exhibited.

The power system 40 in the transportation drives the predetermined space A (that is, transportation) in which a person stays, for the main purpose. Thus, the power system 40 in the transportation generates energy larger than that of a power generator and the like included in a living space in which driving the predetermined space A is not required.

Thus, thermal energy generated from the power system 40 has also an amount more than that of the power generator and the like, and the temperature of the $CO_2$ absorption material 31 is controlled by using the large amount of thermal energy. Accordingly, an effect in that the temperature of the $CO_2$ absorption material 31 is easily controlled is exhibited.

Further, the predetermined space A is more preferably an interior of a vehicle (vehicle interior). In this case, the interior is narrow and thus an air is relatively effectively circulated in comparison to a case where the predetermined space A is an interior of a train or an airplane (on board). Thus, the $CO_2$ concentration control device 1 more accurately measures the $CO_2$ concentration of the interior (predetermined space A), and thus an effect in that the carbon dioxide concentration of the predetermined space A can be more accurately controlled is exhibited. Since the interior is narrow, an amount of the $CO_2$ absorption material 31 mounted in the $CO_2$ concentration control device 1 can be set to be relatively small. Thus, an effect in that cost of the $CO_2$ concentration control device 1 and the $CO_2$ concentration control system 100 can be reduced is exhibited.

Flow of Processing of Controlling $CO_2$ Concentration

Lastly, an example of processing in which the $CO_2$ concentration control device 1 controls the carbon dioxide concentration in a space will be described. FIG. 4 is a flowchart illustrating an example of the processing in which the $CO_2$ concentration control device 1 controls the $CO_2$ concentration.

If the $CO_2$ concentration control device 1 starts (power of the device or a control function of the carbon dioxide concentration turns ON), the measuring unit 20 starts measuring the $CO_2$ concentration (S10). The measuring unit 20 transmits information indicating the measured $CO_2$ concentration, to the temperature determination unit 11. If the temperature determination unit 11 receives the $CO_2$ concentration measured by the measuring unit 20, the temperature determination unit 11 determines whether or not the $CO_2$ concentration is equal to or less than a setting value (S12).

In a case where the $CO_2$ concentration measured by the measuring unit 20 is equal to or less than the setting value (YES in S12), it means that the $CO_2$ concentration in an air is not a concentration harmful to health. In this case, the temperature determination unit 11 determines the temperature of the $CO_2$ absorption unit 30 to be a temperature at which the $CO_2$ absorption rate is the device lower limit rate. The temperature control unit 12 controls an amount of the thermal medium flowing in the $CO_2$ absorption unit 30 from the heat exchanger 50, so as to be a temperature determined by the temperature determination unit 11, and thus adjusts heat quantity transferred to the $CO_2$ absorption unit 30 (S14). Thus, since the $CO_2$ absorption rate of the $CO_2$ absorption material 31 is the device lower limit rate, fluctuation of the $CO_2$ concentration in the air is suppressed to be smallest.

In a case where the $CO_2$ concentration detected by the measuring unit 20 is more than the setting value (NO in S12), it means that the $CO_2$ concentration in the air is a concentration harmful to health. In this case, the temperature determination unit 11 determines the setting temperature of the $CO_2$ absorption unit 30 to be a temperature at which the $CO_2$ absorption rate is faster than the device lower limit rate. The temperature control unit 12 controls an amount of the thermal medium flowing in the $CO_2$ absorption unit 30 from the heat exchanger 50, so as to cause the temperature of the $CO_2$ absorption unit 30 to be the setting temperature (S16). Thus, the $CO_2$ absorption rate of the $CO_2$ absorption unit 30 becomes a rate depending on the setting temperature, that is, becomes a rate faster than the device lower limit rate. The $CO_2$ absorption unit 30 absorbs $CO_2$ in the air. The processes of S12 to S16 are performed every time the measuring unit 20 measures the carbon dioxide concentration, and are repeated until the $CO_2$ concentration control device 1 is stopped (power of the device or the control function of the $CO_2$ concentration turns OFF).

The $CO_2$ concentration control device 1 takes an air into the own device from the predetermined space A, and sends the taken air to the $CO_2$ absorption unit 30, while controlling the temperature of the $CO_2$ absorption unit 30 in this manner. When the sent air passes through a space of the $CO_2$ absorption unit 30, the $CO_2$ absorption unit 30 absorbs carbon dioxide in an air at the $CO_2$ absorption rate depending on the temperature of the $CO_2$ absorption unit 30 at a time of the passing. An air after carbon dioxide is absorbed is discharged into the predetermined space A.

Specific Example of Setting Temperature

Here, an example of the setting temperature of the $CO_2$ absorption material 31 will be described in detail. In the following descriptions, it is assumed that lithium composite oxide is used as (a material of) the $CO_2$ absorption material 31. In the following descriptions, the temperatures (Tb, Ta, and Tu) correspond to a graph of a relation between the temperature of lithium composite oxide and the $CO_2$ absorption rate illustrated in FIG. 3.

In a case where the $CO_2$ absorption rate measured by the measuring unit 20 is more than the setting value (NO in S12), the temperature determination unit 11 desirably determines the setting temperature as Ta. In this case, since the $CO_2$ absorption rate of the $CO_2$ absorption material 31 becomes the maximum, the $CO_2$ concentration control device 1 can absorb carbon dioxide of the most amount, from the taken air. Thus, the $CO_2$ concentration control device 1 has an advantage in that the $CO_2$ absorption rate in the space can be lowered faster.

In a case where the $CO_2$ absorption rate detected by the measuring unit 20 is more than the setting value (NO in S12), the temperature determination unit 11 may determine the setting temperature to be a temperature which is higher than Tb and is lower than Ta. In this case, the $CO_2$ concentration control device 1 has an advantage in that the temperature of the $CO_2$ absorption material 31 can be controlled fast.

In a case where the $CO_2$ absorption rate measured by the measuring unit 20 is equal to or less than the setting value (YES in S12), the temperature determination unit 11 may determine the setting temperature (that is, device lower limit rate) to be a temperature (for example, room temperature) in a state where thermal energy is not applied to the $CO_2$ absorption material 31. In this case, the temperature control unit 12 may simply block heat (dissipate heat of the $CO_2$ absorption material 31) transferred to the $CO_2$ absorption material 31 from the power system 40, without using exhaust heat of the power system 40. Thus, it is possible to control the temperature of the $CO_2$ absorption material 31 more easily. In this case, unnecessary power may be not consumed for controlling an amount of the thermal medium flowing from the heat exchanger 50 (controlling the flow rate control valve 60). Thus, it is possible to reduce consumed energy.

In a case where the $CO_2$ absorption rate measured by the measuring unit 20 is equal to or less than the setting value (YES in S12), the temperature determination unit 11 may set the setting temperature to be a temperature closer to Ta and to be a temperature (for example, Tb) at which the $CO_2$ absorption rate is a device lower limit rate. In this case, the $CO_2$ absorption material 31 maintains the temperature to be a temperature closer to Ta even when carbon dioxide is not absorbed. Thus, in a case where the $CO_2$ absorption rate in the air is changed and absorbing carbon dioxide is required, there is an advantage in that it is possible to rise the temperature of the $CO_2$ absorption material 31 faster, and to absorb carbon dioxide faster.

With the above configuration, the $CO_2$ concentration control device 1 in the $CO_2$ concentration control system 100 repeats adjustment of the temperature of the $CO_2$ absorption material 31 and taking and discharging of an air. Thus, it is possible to cause the $CO_2$ absorption material 31 to absorb carbon dioxide at an absorption rate depending on the $CO_2$ concentration in the air. Accordingly, the $CO_2$ concentration control device 1 can prevent unnecessary absorption of carbon dioxide and maintain the carbon dioxide concentration in the air to have an appropriate value.

Here, exhaust heat of the power system 40 is used for adjusting the temperature of the $CO_2$ absorption material 31. Thus, the $CO_2$ concentration control device 1 can reduce consumed energy which relates to a control of the temperature of the $CO_2$ absorption material 31. Since the $CO_2$ concentration control device 1 use the exhaust heat, it is possible to control the temperature of the $CO_2$ absorption material 31 even though a device for heating or cooling the $CO_2$ absorption material 31 is not separately provided. Accordingly, the $CO_2$ concentration control device 1 can control the $CO_2$ concentration in an air to have an appropriate value with lower consumed energy and smaller number of components.

Since the $CO_2$ concentration control device 1 controls the $CO_2$ absorption rate of the absorption material itself so as to control the carbon dioxide concentration in the space, for example, there is no need for managing and controlling a complex parameter such as an amount of an air taken from the space. Thus, the $CO_2$ concentration control device 1 can simply control an amount of carbon dioxide to be absorbed from the air.

With the above configuration, the temperature control unit 12 of the $CO_2$ concentration control device 1 controls the flow rate control valve 60 in accordance with the setting temperature received from the temperature determination unit 11 and the measured temperature of the $CO_2$ absorption material 31, which has been received from the $CO_2$ absorption unit 30, and thus adjusts an amount of the thermal medium flowing into the heat exchanger 50. Thus, the heat exchanger 50 controls the amount of the thermal medium which absorbs heat. The thermal medium having the controlled temperature passes through the $CO_2$ absorption unit 30 (comes into contact with or is close to the $CO_2$ absorption material 31), and thus the temperature of the $CO_2$ absorption material 31 is adjusted. In this manner, the flow rate of the thermal medium is adjusted by using the flow rate control valve 60, and thus an effect in that it is possible to control the temperature of the $CO_2$ absorption material 31 fast and accurately is exhibited. The effect is obtained from all $CO_2$ concentration control systems which include the heat exchanger 50 and the flow rate control valve 60 and will be described in the following embodiments, in addition to the $CO_2$ concentration control system 100 described in this embodiment.

Modification Example 1 of Controlling Temperature of $CO_2$ Absorption Material

The $CO_2$ concentration control device 1 may have a configuration in which the temperature of the $CO_2$ absorption material 31 is controlled such that the $CO_2$ absorption rate of the $CO_2$ absorption material 31 becomes faster as a difference between the $CO_2$ concentration measured by the measuring unit 20 and the setting value is increased. That is, the $CO_2$ concentration control device 1 may determine the setting temperature of the $CO_2$ absorption material 31 in stages, in accordance with the difference between the $CO_2$ concentration and the setting value.

Processing control of the $CO_2$ concentration control device 1 in a case of determining the setting temperature of the $CO_2$ absorption material 31 in stages will be described with reference to FIGS. 5 and 6. FIG. 5 is a table indicating a relationship between the $CO_2$ concentration detected by the measuring unit 20, the setting value, and the setting temperature of the $CO_2$ absorption material 31 determined by the temperature determination unit 11 in the $CO_2$ concentration control device 1.

A column of "($CO_2$ concentration—setting value)" indicates a difference (value of $CO_2$ concentration—setting value) between the $CO_2$ concentration measured by the measuring unit 20 and the setting value. A column of "setting temperature" indicates the setting temperature of the $CO_2$ absorption material 31, which is determined by the temperature determination unit 11. Values of $S_1$, $S_{X-1}$, and $S_X$ in FIG. 5 satisfy $0<S_1<S_{X-1}<S_X$. A value Ta indicating the temperature of the $CO_2$ absorption material 31 corresponds to a symbol in the graph of FIG. 3. $T_1$ and $T_X$ satisfy a temperature (at which the $CO_2$ absorption rate of the $CO_2$ absorption material 31 is the device lower limit rate)$<T_1<T_X<$Ta. X of $S_{X-1}$, $S_X$, $T_X$, and the like indicates a certain natural number.

That is, the temperature determination unit 11 separates the difference between the $CO_2$ concentration and the setting value into X stages, and the setting temperature (temperature functioning as the device lower limit rate, $T_1, \ldots, T_X$, and Ta) of the $CO_2$ absorption material 31 is determined based on whether or not the difference is equal to or less than each of separation values $(0, S_1, \ldots, S_X)$. If the measured value of the $CO_2$ concentration is received from the measuring unit 20, the temperature determination unit 11 calculates the difference between the received $CO_2$ concentration and a predetermined setting value. The temperature determination unit 11 determines the setting temperature of the $CO_2$ absorption material 31 in accordance with the size of the value of the calculated difference, as illustrated in FIG. 5. The temperature determination unit 11 notifies the temperature control unit 12. The $CO_2$ concentration control device 1 may determine the temperature of the $CO_2$ absorption material 31 under the conditions illustrated in FIG. 5, and not necessarily stores and refers to the table as illustrated in FIG. 5.

Next, a specific flow of controlling the temperature of the $CO_2$ concentration control device 1 will be described with reference to FIG. 6 and the table illustrated in FIG. 5. FIG. 6 illustrates another example of temperature control processing of the $CO_2$ concentration control device 1.

When the $CO_2$ concentration control device 1 operates (takes an air), the measuring unit 20 measures the $CO_2$ concentration in an air at a predetermined time interval (S20), and transmits the measured concentration to the temperature determination unit 11. If the temperature determination unit 11 receives the measured $CO_2$ concentration, the temperature determination unit 11 firstly calculates a difference from the setting value.

In a case where the difference between the measured $CO_2$ concentration and the setting value is equal to or less than 0 (YES in S22), the $CO_2$ concentration is equal to or less than the setting value. That is, the $CO_2$ concentration of the predetermined space A is maintained to be an appropriate concentration. In this case, as illustrated in FIG. 5, the temperature determination unit 11 determines the setting temperature to be a temperature (for example, room temperature) at which the $CO_2$ absorption rate is the device lower limit rate, and notifies the temperature control unit 12.

If the temperature control unit 12 receives a notification of the setting temperature from the temperature determination unit 11, the temperature control unit 12 controls the temperature to be a temperature at which the $CO_2$ absorption rate of the $CO_2$ absorption material 31 is the device lower limit rate, by using exhaust heat generated in the power system 40 (S24). Thus, the $CO_2$ absorption rate of lithium composite oxide is largely suppressed, and the fluctuation of the $CO_2$ concentration in the air is suppressed to be the minimum.

In a case where the difference between the carbon dioxide concentration and the setting value is more than 0, and is equal to or less than $S_1$ (NO in S22 and YES in S26), the temperature determination unit 11 determines the setting temperature to be $T_1$ which is the first-stage temperature. The temperature control unit 12 controls the temperature by using the exhaust heat generated in the power system 40, such that the temperature of the $CO_2$ absorption material 31 is $T_1$ (S28). Thus, the $CO_2$ absorption material 31 is in a state of absorbing carbon dioxide in the air.

Then, the temperature determination unit 11 determines whether or not the difference between the $CO_2$ concentration and the setting value is equal to or less than a predetermined separation value. In a case of being equal to or less than the separation value, the temperature determination unit 11 determines a temperature depending on the separation value, as the setting temperature. For example, in a case where the difference between the $CO_2$ concentration and the setting value is more than $S_{X-2}$ and is equal to or less than $S_{X-1}$ (YES in S30), the temperature determination unit 11 determines the setting temperature to be $T_{X-1}$ which is a temperature of the (X−1)th stage. The temperature control unit 12 controls the temperature such that the temperature of the $CO_2$ absorption material 31 is $T_{X-1}$ (S32). In a case where the difference between the $CO_2$ concentration and the setting value is more than $S_{X-1}$ and is equal to or less than $S_X$ (NO in S30 and YES in S34), the temperature determination unit 11 determines the setting temperature to be $T_X$ which is a temperature of the Xth stage (higher than $T_{X-1}$). The temperature control unit 12 controls the temperature so as to cause the temperature to be $T_X$ (S36).

Lastly, in a case where the difference between the $CO_2$ concentration and the setting value is more than $S_X$ (NO in S34), it is recognized that the $CO_2$ concentration in the space is out of a frame of the separation values ($S_1$, . . . , $S_X$) set by the $CO_2$ concentration control device 1. In this case, the temperature determination unit 11 determines the setting temperature to be Ta which is a temperature at which carbon dioxide is absorbed up to the maximum (at the fastest rate). The temperature control unit 12 controls the temperature by using the exhaust heat generated in the power system 40, so as to cause the temperature of the $CO_2$ absorption material 31 to be Ta (S38).

Figure 6:
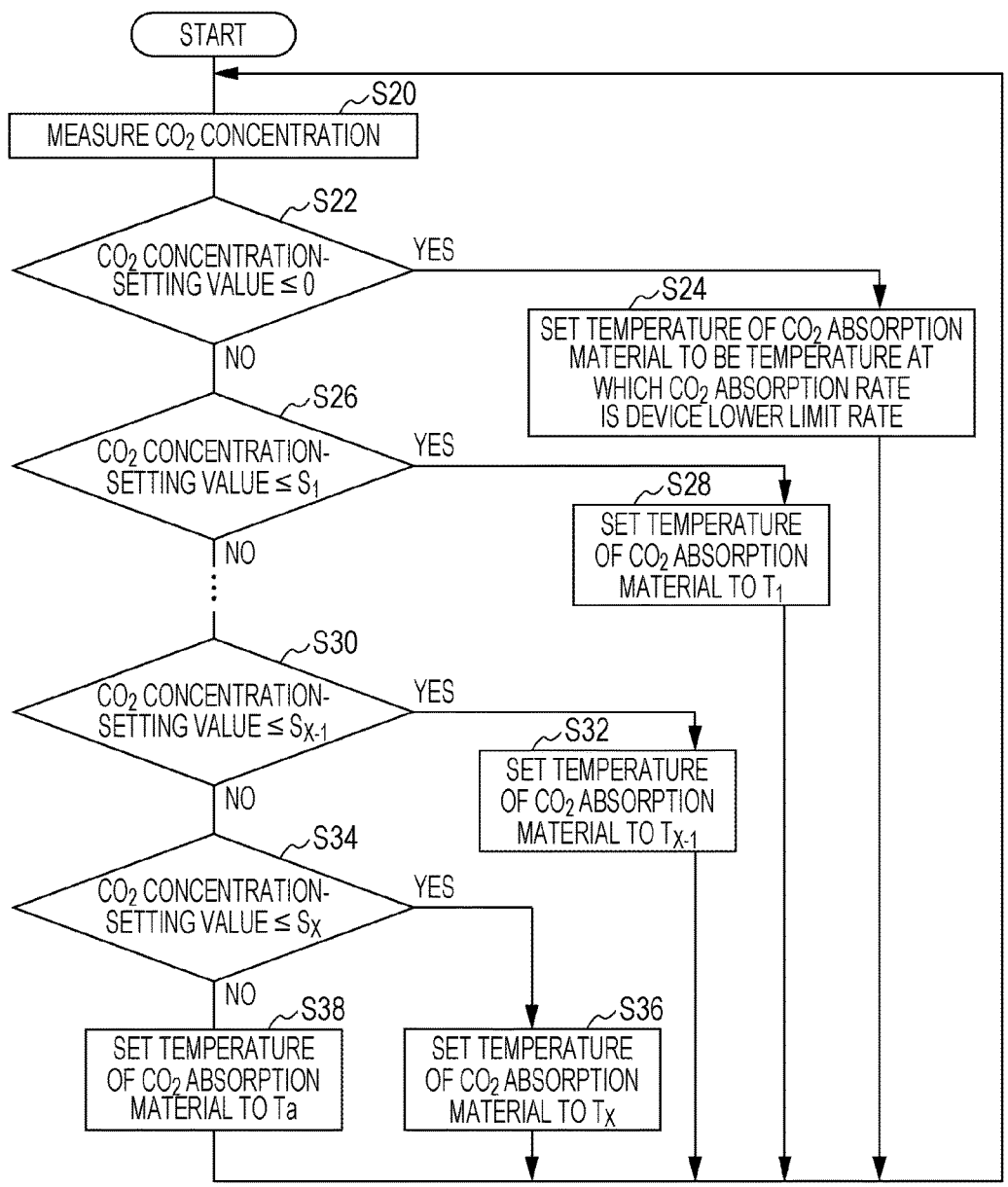
FIG. 6 illustrates another example of a temperature control process of the $CO_2$ concentration control device.

Hitherto, according to the flow of the processing illustrated in FIG. 6, the $CO_2$ concentration control device 1 determines the setting temperature in stages, in accordance with the difference between the $CO_2$ concentration and the setting value. Thus, it is possible to delicately change the $CO_2$ absorption rate of the $CO_2$ absorption material 31. Accordingly, it is possible to prevent an occurrence as follows: for example, in a case where the $CO_2$ concentration in the air is just slightly higher than the setting value, $CO_2$ absorption of the $CO_2$ absorption material 31 is performed too fast, and carbon dioxide in the air is absorbed to an unnecessary extent.

According to the flow of the processing illustrated in FIG. 6, since the setting temperature is set to be a temperature lower than Ta as described above, an effect in that a time relating to the control (heating) of the temperature is suppressed, and thus the temperature can be controlled fast in comparison to the $CO_2$ concentration control device 1 according to Embodiment 1 is exhibited.

In a case where the $CO_2$ concentration in the air largely exceeds the setting value, the $CO_2$ absorption rate of the $CO_2$ absorption material 31 is set to be the maximum, and thus an effect in that it is possible to cause the $CO_2$ concentration in the space to be close to the setting value faster is exhibited.

Modification Example 2 of Controlling Temperature of $CO_2$ Absorption Material

The $CO_2$ absorption material 31 is desirably an absorption material which absorbs carbon dioxide in an air and can discharge the absorbed carbon dioxide (refresh the $CO_2$ absorption unit 30). A refresh function of the $CO_2$ absorption material 31 will be described below by using lithium composite oxide as an example.

Lithium composite oxide has properties of emitting the absorbed carbon dioxide if the temperature thereof becomes a temperature higher (higher than Tu in FIG. 3) than a temperature at which carbon dioxide can be absorbed. Thus, in a case of using lithium composite oxide as the $CO_2$ absorption material 31, the $CO_2$ concentration control device 1 can refresh the lithium composite oxide by using the above properties.

Specifically, for example, when the $CO_2$ absorption rate of lithium composite oxide is saturated, or when absorption capacity of lithium composite oxide is dropped so as to be equal to or less than a predetermined value, the $CO_2$ concentration control device 1 is put out a space (predetermined space A) of which the $CO_2$ concentration is being controlled. The temperature of lithium composite oxide is controlled to be a temperature (temperature higher than Tu) at which carbon dioxide is emitted. Thus, carbon dioxide absorbed to lithium composite oxide (carbon dioxide contained in an air in the space) is emitted. Only in a case of performing refresh, a configuration in which carbon dioxide emitted from the $CO_2$ absorption unit 30 is discharged to the outside of the predetermined space A may be made. In this case, an effect in that the $CO_2$ concentration in the predetermined space A is not increased, but refresh of the $CO_2$ absorption material 31 included in the $CO_2$ absorption unit 30 can be performed is exhibited.

In the related art, an amine-based material or activated carbon has been used as a material of the $CO_2$ absorption material. Among the substances, the amine-based material is strongly chemically bonded to carbon dioxide, and thus the amine-based material requires large energy for discharging (refreshing) the absorbed carbon dioxide. Because the activated carbon has difficulty in discharging the absorbed carbon dioxide, frequent exchange of an adsorbent is required. Thus, cost relating to the exchange is generated.

On the contrary, as described above, the $CO_2$ concentration control device 1 appropriately refreshes the $CO_2$ absorption material 31 by using a refreshable absorption material as the $CO_2$ absorption material 31. Thus, it is possible to reuse the $CO_2$ absorption material 31. Accordingly, an effect in that the exchange of the $CO_2$ absorption material 31 is not required or exchange frequency can be reduced is exhibited.

The $CO_2$ concentration control device 1 may have a configuration in which the weight of the $CO_2$ absorption material 31 (or $CO_2$ absorption unit 30), or the maximum value of the $CO_2$ absorption rate is measured, and thus a timing of the refresh is specified. With the above configuration, the $CO_2$ concentration control device 1 can accurately specify a timing at which refresh of the $CO_2$ absorption material 31 is required. Thus, the absorption capacity of the $CO_2$ absorption material 31 can be utilized to the maximum, and the $CO_2$ concentration can be controlled more accurately.

Further, the $CO_2$ concentration control device 1 may have a configuration of notifying a user of the specified timing. Thus, the $CO_2$ concentration control device 1 can perform an operation for refreshing the $CO_2$ absorption material 31, at a timing appropriate for the user.

Modification Example 3 of Controlling Temperature of $CO_2$ Absorption Material

In a case where a material which can discharge the absorbed carbon dioxide is used as the $CO_2$ absorption material 31, the $CO_2$ concentration control device 1 may discharge carbon dioxide from the $CO_2$ absorption material 31 into the predetermined space A, and thus may control the $CO_2$ concentration in an air to be in a predetermined range.

If the $CO_2$ concentration in the air is equal to or more than a predetermined value (for example, 1000 ppm), the $CO_2$ concentration may damage health of a person. However, an excessive decrease of the $CO_2$ concentration in the air is also not preferable for the health of the person. For example, if carbon dioxide in the air is insufficient, a person breathes in the air may have blood which becomes alkaline, and thus faint or cramp may be caused. Thus, in order to maintain the $CO_2$ concentration in the space to be an appropriate concentration, it is more preferable that a lower limit value is set in addition to an upper limit value of the $CO_2$ concentration in the space, and the $CO_2$ concentration is controlled. Accordingly, the $CO_2$ concentration control device 1 may control the $CO_2$ concentration in the space to be in a predetermined range, by using an absorption material which can discharge the absorbed carbon dioxide, as the $CO_2$ absorption material 31.

As described above, lithium composite oxide has properties of emitting the absorbed carbon dioxide if the temperature thereof becomes a temperature higher (higher than Tu in FIG. 3) than a temperature at which carbon dioxide can be absorbed. The $CO_2$ concentration control device 1 according to this embodiment uses the properties, and thus sets the temperature of lithium composite oxide to be a temperature Tr which is higher than Tu, by using the exhaust heat of the power system 40 in a case where the $CO_2$ concentration is equal to or less than the lower limit setting value. Accordingly, it is possible to discharge carbon dioxide in the lithium composite oxide as the $CO_2$ absorption material 31.

In this case, the temperature determination unit 11 determines a size relationship between the $CO_2$ concentration received from the measuring unit 20, and "the upper limit setting value" and "the lower limit setting value". Here, "the upper limit setting value" is similar to the above-described setting value. The "lower limit setting value" is a lower limit value of the carbon dioxide concentration considered as being appropriate in the predetermined space A. For example, the lower limit value of the carbon dioxide concentration, which does not damage health of a person, may be set to the lower limit setting value.

In a case where the $CO_2$ concentration detected by the measuring unit 20 is more than the upper limit setting value (setting value), the temperature determination unit 11 determines the setting temperature to be a temperature at which the $CO_2$ absorption material 31 absorbs carbon dioxide in an air. In a case where the $CO_2$ concentration is equal to or less than the lower limit setting value, the temperature determination unit 11 determines the setting temperature to be a temperature at which carbon dioxide absorbed by the $CO_2$ absorption material 31 is discharged. In a case where the $CO_2$ concentration is equal to or less than the upper limit setting value and is more than the lower limit setting value, the temperature determination unit 11 determines the setting temperature to be a temperature (for example, room temperature and the like) at which the $CO_2$ absorption rate is the device lower limit rate.

A $CO_2$ discharge rate of lithium composite oxide depends on a temperature, similarly to the $CO_2$ absorption rate. Thus, the $CO_2$ concentration control device 1 may change the temperature Tr in stages, and thus may control the $CO_2$ discharge rate of carbon dioxide, similarly to stepwise adjustment of the $CO_2$ absorption rate illustrated in FIGS. 5 and 6.

Figure 7:
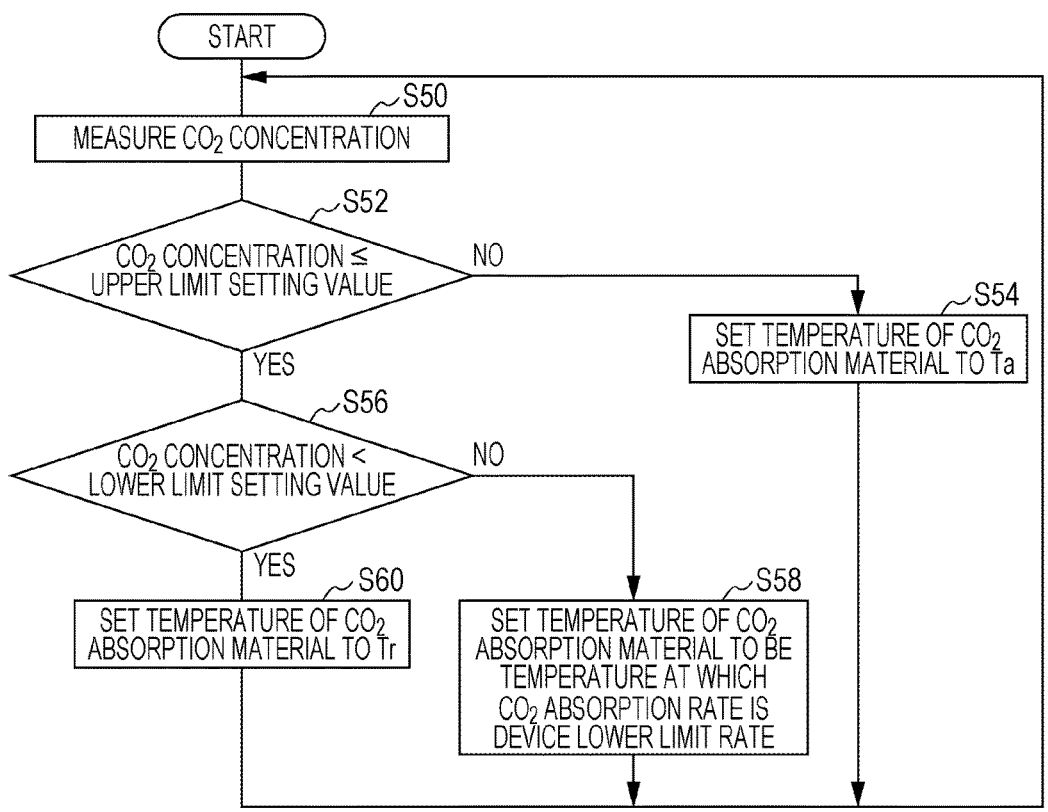
FIG. 7 is a flowchart illustrating still another example of the temperature control process of the $CO_2$ concentration control device.

A flow of $CO_2$ concentration control processing in a case of using the $CO_2$ absorption material 31 which can discharge carbon dioxide in the $CO_2$ concentration control device 1 will be described with reference to FIG. 7. FIG. 7 is a flowchart illustrating still another example of the temperature control processing of the $CO_2$ concentration control device 1. S50 in FIG. 7 is the same process as S10 in FIG. 4. Thus, here, descriptions thereof will be omitted.

If the temperature determination unit 11 receives the $CO_2$ concentration measured by the measuring unit 20, the temperature determination unit 11 determines whether or not the $CO_2$ concentration is equal to or less than the upper limit setting value (S52). In a case where the $CO_2$ concentration detected by the measuring unit 20 is more than the upper limit setting value (NO in S52), the temperature determination unit 11 determines the setting temperature to be Ta. The temperature control unit 12 controls the temperature by using the exhaust heat of the power system 40, so as to cause the temperature of the $CO_2$ absorption material 31 to be Ta (S54). Thus, the $CO_2$ absorption material 31 is in a state of absorbing carbon dioxide up to the maximum (at the highest rate).

In a case where the $CO_2$ concentration detected by the measuring unit 20 is equal to or less than the upper limit setting value (YES in S52), the temperature determination unit 11 determines whether or not $CO_2$ concentration is smaller than the lower limit setting value (S56). Here, in a case where the $CO_2$ concentration is equal to or more than the lower limit setting value (NO in S56), the temperature determination unit 11 determines the setting temperature to be a temperature at which the $CO_2$ absorption rate is the device lower limit rate. The temperature control unit 12 controls the temperature by using the exhaust heat of the power system 40, so as to cause the temperature of the $CO_2$ absorption material 31 to be the setting temperature (S58). Thus, the $CO_2$ absorption rate of the $CO_2$ absorption material 31 becomes the device lower limit rate. That is, the $CO_2$ absorption rate of the $CO_2$ absorption material 31 is largely suppressed, and the fluctuation of the $CO_2$ concentration in the air is suppressed to be the minimum.

On the contrary, in a case where the $CO_2$ concentration is smaller than the lower limit setting value (YES in S56), the temperature determination unit 11 determines the temperature of the $CO_2$ absorption material 31 to be Tr. The temperature control unit 12 controls the temperature by using the exhaust heat of the power system 40, so as to cause the temperature of the $CO_2$ absorption material 31 to be Tr (S60). Thus, the $CO_2$ absorption material 31 discharges carbon dioxide absorbed until now, to the air.

An order of the determinations in S52 and S56 may be reversed. In S58, the temperature determination unit 11 may set the temperature (at which the $CO_2$ absorption rate is the device lower limit rate) of the $CO_2$ absorption material 31, to be Tu illustrated in FIG. 3. Tu indicates a temperature which is higher than Ta and is lower than Tr, and a temperature which functions as a boundary point between absorption and discharge of carbon dioxide. Thus, in a case where the temperature of the $CO_2$ absorption material 31 is set to be Tu in S58, the width of temperature change of the $CO_2$ absorption material 31 is narrower than, for example, that in a case of setting the temperature to be room temperature, and the like. Accordingly, the temperature control unit 12 can adjust the temperature of the $CO_2$ absorption material 31 to be the temperature determined by the temperature determination unit 11 for a shorter time. In a case where heat of the $CO_2$ absorption material 31 is dissipated (to be room temperature) in S58, in the above-described process of S58, the exhaust heat from the power system 40 may be blocked (that is, a flow of the thermal medium which has passed through the heat exchanger 50, into the $CO_2$ absorption unit 30 is stopped). Thus, there is an advantage in that the temperature is easily controlled.

According to the above process, in a case where the $CO_2$ concentration in the air is more than the upper limit setting value (NO in S52), that is, in a case where the $CO_2$ concentration in the air is out of an appropriate range, the $CO_2$ concentration control device 1 causes the $CO_2$ absorption material 31 to absorb carbon dioxide, and thus reduces $CO_2$ concentration in the air. In a case where the $CO_2$ concentration in the air is equal to or less than the upper limit setting value, and is equal to or more than the lower limit setting value (NO in S56), that is, in a case where the $CO_2$ concentration in the air is in the appropriate range, the $CO_2$ absorption rate is largely suppressed, and thus the appropriate $CO_2$ concentration is maintained. In addition, in a case where the $CO_2$ concentration in the air is smaller than the lower limit setting value (YES in S56), the $CO_2$ concentration in the air is set to be less than the appropriate range. Thus, carbon dioxide is discharged from the $CO_2$ absorption material 31 to the air, and thus the $CO_2$ concentration in the air is increased. Accordingly, when the $CO_2$ concentration in the air is excessively lowered, the $CO_2$ concentration is increased, and thus can be set to an appropriate $CO_2$ concentration.

In this manner, the $CO_2$ concentration control device 1 according to this embodiment controls the $CO_2$ concentration in an air of the predetermined space A to be in a predetermined range. Thus, it is possible to stably maintain the $CO_2$ concentration in the predetermined space A to be a concentration in an appropriate range for a long term. If the $CO_2$ concentration in the predetermined space A is smaller than the lower limit setting value, carbon dioxide is discharged from the $CO_2$ absorption material 31 in the $CO_2$ absorption unit 30. Thus, it is possible to reduce the frequency of refresh or exchange of the $CO_2$ absorption material 31.

Embodiment 2

A second embodiment according to the present invention will be described with reference to FIG. 8, as follows. For simple descriptions, members having the same functions as those of the members described in the above embodiment are denoted by the same reference signs, and descriptions thereof will be omitted.

Figure 8:
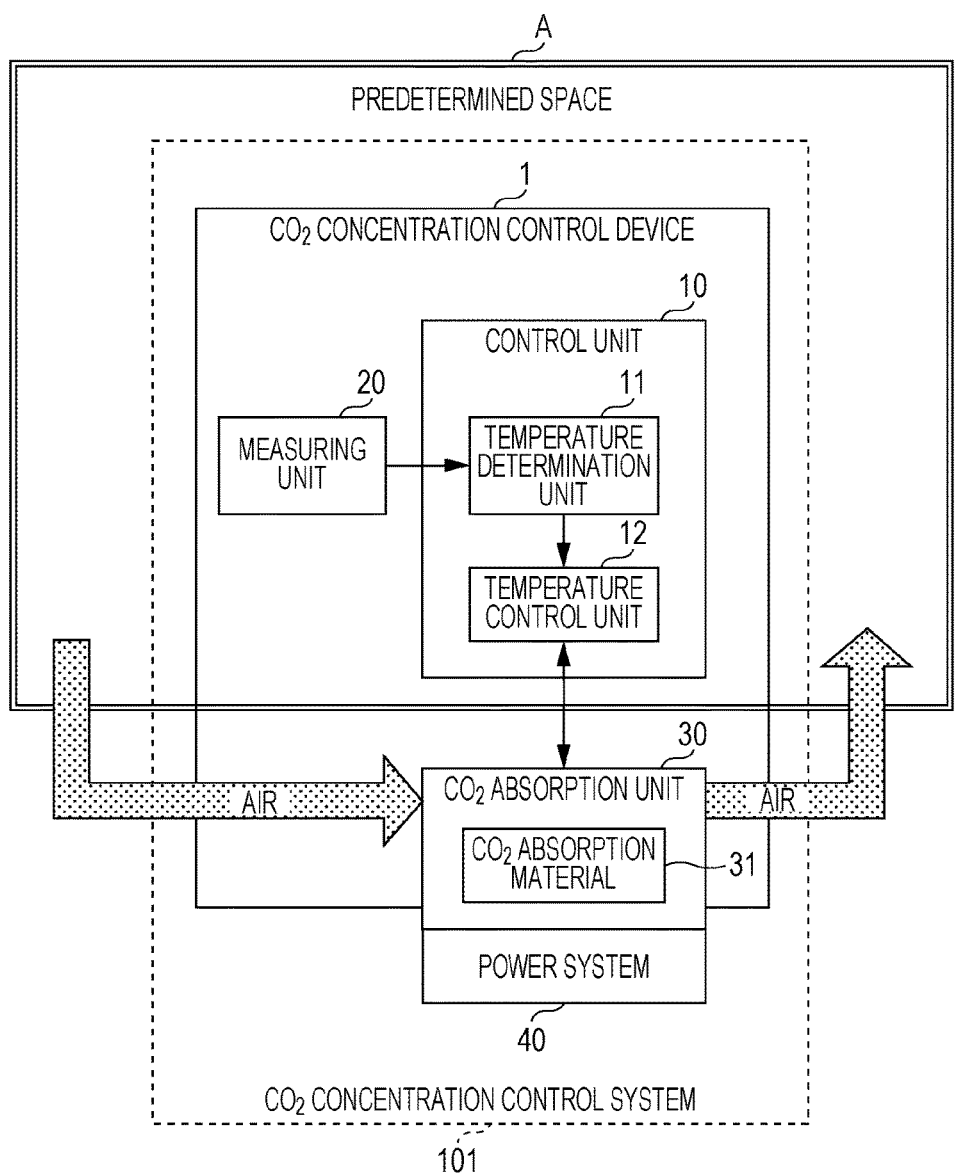
FIG. 8 is a diagram illustrating a configuration of a $CO_2$ concentration control system according to Embodiment 2 of the present invention.

FIG. 8 is a diagram illustrating a configuration of a $CO_2$ concentration control system 101 according to Embodiment 2 of the present invention. The $CO_2$ concentration control system 101 has a configuration obtained by excluding the heat exchanger 50 and the flow rate control valve 60 from the configuration described in the $CO_2$ concentration control system 100. In FIG. 8, it is assumed that an air flows in a direction indicated by an arrow.

In the $CO_2$ concentration control system 101, the $CO_2$ absorption unit 30 is provided in the vicinity of the power system 40, which is an outside of the predetermined space A. The $CO_2$ absorption unit 30 is provided so as to enable change of a distance from the power system 40. In a case where the power system 40 is provided in the predetermined space A, the $CO_2$ absorption unit 30 may be provided in the predetermined space A.

In this embodiment, the temperature control unit 12 adjusts the size of the heat quantity acquired from the power system 40 by the $CO_2$ absorption unit 30, and thus controls the temperature of the $CO_2$ absorption material 31. For example, the temperature control unit 12 moves the $CO_2$ absorption unit 30, so as to control a distance between the $CO_2$ absorption unit 30 and the power system 40, and to adjust the size of the heat quantity acquired from the power system 40.

According to the configuration of the $CO_2$ concentration control system 101 in this embodiment, the distance between the $CO_2$ absorption unit 30 and the power system 40 is adjusted, and thus it is possible to simply adjust the size of the heat quantity acquired from the power system 40 by the $CO_2$ absorption unit 30. According to the configuration of the $CO_2$ concentration control system 101 in this embodiment, it is possible to control the temperature of the $CO_2$ absorption material 31 by using exhaust heat, even though the heat exchanger 50 and the flow rate control valve 60 are not provided. Thus, the $CO_2$ concentration control system 101 exhibits effects in that it is possible to reduce the number of devices constituting the system, and to reduce cost of the entirety of the system.

Embodiment 3

Figure 9:
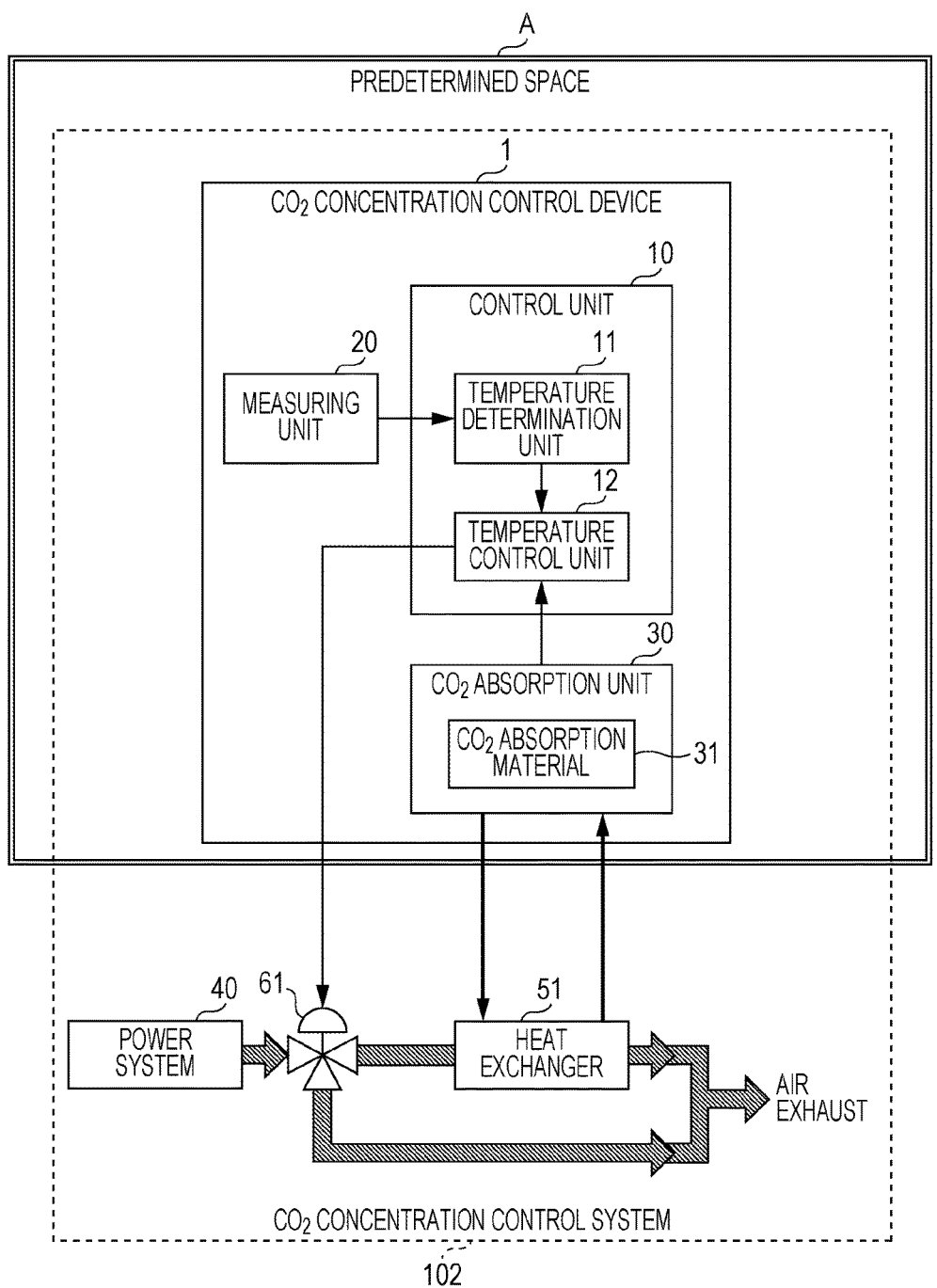
FIG. 9 is a diagram illustrating a configuration of a $CO_2$ concentration control system according to Embodiment 3 of the present invention.

A third embodiment according to the present invention will be described with reference to FIGS. 9 and 10, as follows. FIG. 9 is a diagram illustrating a configuration of a $CO_2$ concentration control system 102 according to Embodiment 3 of the present invention. An arrow drawn by a diagonal line in FIGS. 9 and 10 indicates a flow of an exhaust gas.

$CO_2$ concentration control system 102 includes a heat exchanger 51 (heat exchanger) instead of the heat exchanger 50 described in the $CO_2$ concentration control system 100. The power system 40 of the $CO_2$ concentration control system 102 is a system which discharges an exhaust gas. A flow rate control valve 61 adjusts a flow rate of the exhaust gas discharged from the power system 40, into the heat exchanger 51.

The heat exchanger 51 causes a thermal medium to acquire thermal energy included in the exhaust gas flowing from the power system 40 (and the flow rate control valve 61). In the $CO_2$ concentration control system 102, a flow path of the exhaust gas from the power system 40 is divided into two (may be equal to or more than 2) flow paths in the flow rate control valve 61. The heat exchanger 51 is provided on the one flow path. The heat exchanger 51 will be described below with reference to FIG. 10.

Figure 10:
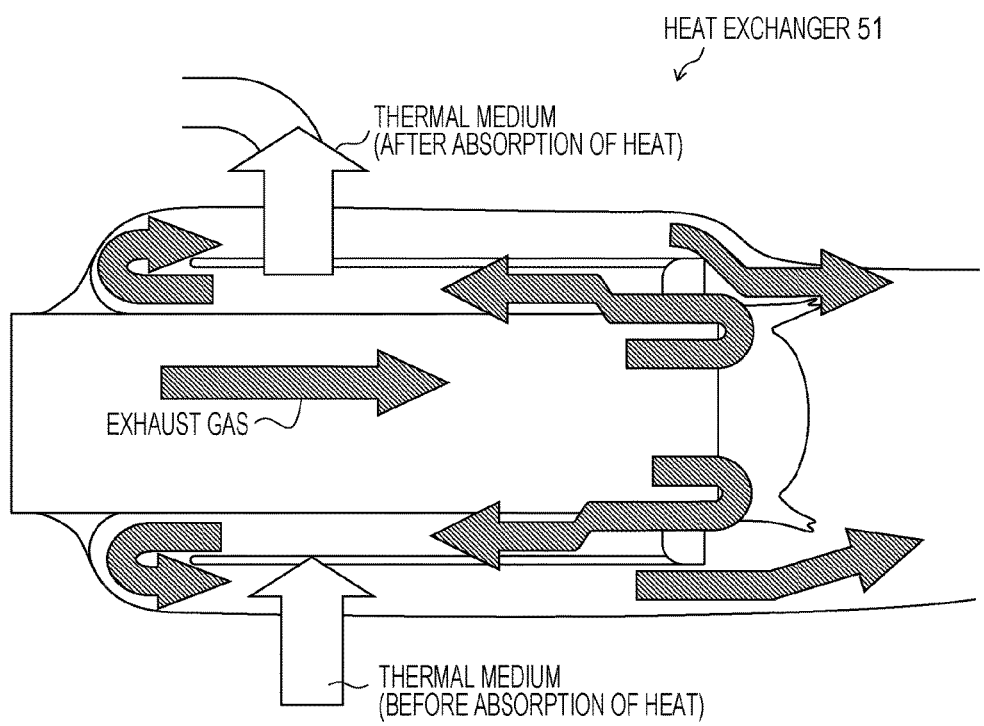
FIG. 10 is a diagram illustrating an example of a structure of a heat exchanger included in the $CO_2$ concentration control system.

FIG. 10 is a diagram illustrating an example of a structure of the heat exchanger 51. As illustrated in FIG. 10, the heat exchanger 51 has a configuration in which an exhaust gas and a thermal medium which contain exhaust heat penetrate the heat exchanger 51. The exhaust gas flowing into the heat exchanger 51 from the power system 40 traces a path indicated by an arrow which has been drawn by a diagonal line in FIG. 5, and the exhaust gas is discharged from the heat exchanger 51. As described above, when the exhaust gas penetrates the heat exchanger 51, the thermal medium passes on a flow path indicated by a white arrow, and thus absorbs thermal energy of the exhaust gas.

The flow rate control valve 61 is different from the flow rate control valve 60 in the $CO_2$ concentration control system 100, in that a flow rate of the exhaust gas, not the thermal medium is adjusted. The flow rate control valve 61 adjusts a flow rate of the exhaust gas supplied to the heat exchanger 51, and a flow rate of the exhaust gas which is not supplied to the heat exchanger 51, in accordance with a control command of the temperature control unit 12. The exhaust gas supplied to the heat exchanger 51 transfers heat to the thermal medium, and discharges the heat, as described above. The exhaust gas which has not been supplied to the heat exchanger 51 is discharged as it is, without passing through other components, as illustrated in FIG. 10.

The temperature control unit 12 controls the flow rate control valve 61 in accordance with the setting temperature determined by the temperature determination unit 11 and the measured temperature by measuring of the $CO_2$ absorption unit 30. Thus, as a result, the temperature control unit 12 controls the heat quantity transferred to a thermal medium in the heat exchanger 51. In other words, the temperature control unit 12 controls the flow rate control valve 61 to indirectly control the temperature of the $CO_2$ absorption material 31.

According to the above configuration, the temperature determination unit 11 of the $CO_2$ concentration control device 1 determines the setting temperature of the $CO_2$ absorption material 31 in accordance with the $CO_2$ concentration in the predetermined space A, which has been measured by the measuring unit 20. The temperature control unit 12 controls the flow rate control valve 61 in accordance with the setting temperature received from the temperature determination unit 11 and the measured temperature of the $CO_2$ absorption material 31 received from the $CO_2$ absorption unit 30. Thus, the temperature control unit 12 controls an amount of the exhaust gas flowing into the heat exchanger 51. Thus, the heat quantity (temperature of the thermal medium) absorbed in the heat exchanger 51 by the thermal medium is controlled. When the thermal medium having the controlled temperature circulates through the flow path, the thermal medium penetrates the $CO_2$ absorption unit 30, and thus the temperature of the $CO_2$ absorption material 31 is adjusted.

In this manner, the $CO_2$ concentration control system 102 can use heat of the exhaust gas which is a big cause of thermal loss in the power system, for controlling the temperature of the $CO_2$ absorption material 31. Thus, it is possible to control the temperature of the $CO_2$ absorption material 31 more efficiently. Thus, the $CO_2$ concentration control system 102 can more reduce consumed energy which relates to the temperature control, and reduce the number of components for heating the $CO_2$ absorption material 31. That is, the $CO_2$ concentration control system 102 can reduce cost for the entirety of the system.

The $CO_2$ concentration control system 102 includes the heat exchanger 51, and thus can control the temperature of the $CO_2$ absorption material 31 by using the thermal medium to which heat of an exhaust gas is transferred, instead of the exhaust gas itself. Thus, for example, in a case where the $CO_2$ absorption unit 30 is provided in the predetermined space A, the temperature of the $CO_2$ absorption material 31 can be controlled without putting the exhaust gas into the predetermined space A. In other words, the $CO_2$ concentration control system 102 includes the heat exchanger 51, and thus exhibits an effect in that leakage of an exhaust gas into the predetermined space A (for example, in a case of a vehicle, vehicle interior) is prevented, and the heat of the exhaust gas can be safely used. This effect is obtained from all $CO_2$ concentration control systems which include the heat exchanger 51 described in the following embodiments, in addition to the $CO_2$ concentration control system 102 described in this embodiment.

Embodiment 4

Figure 11:
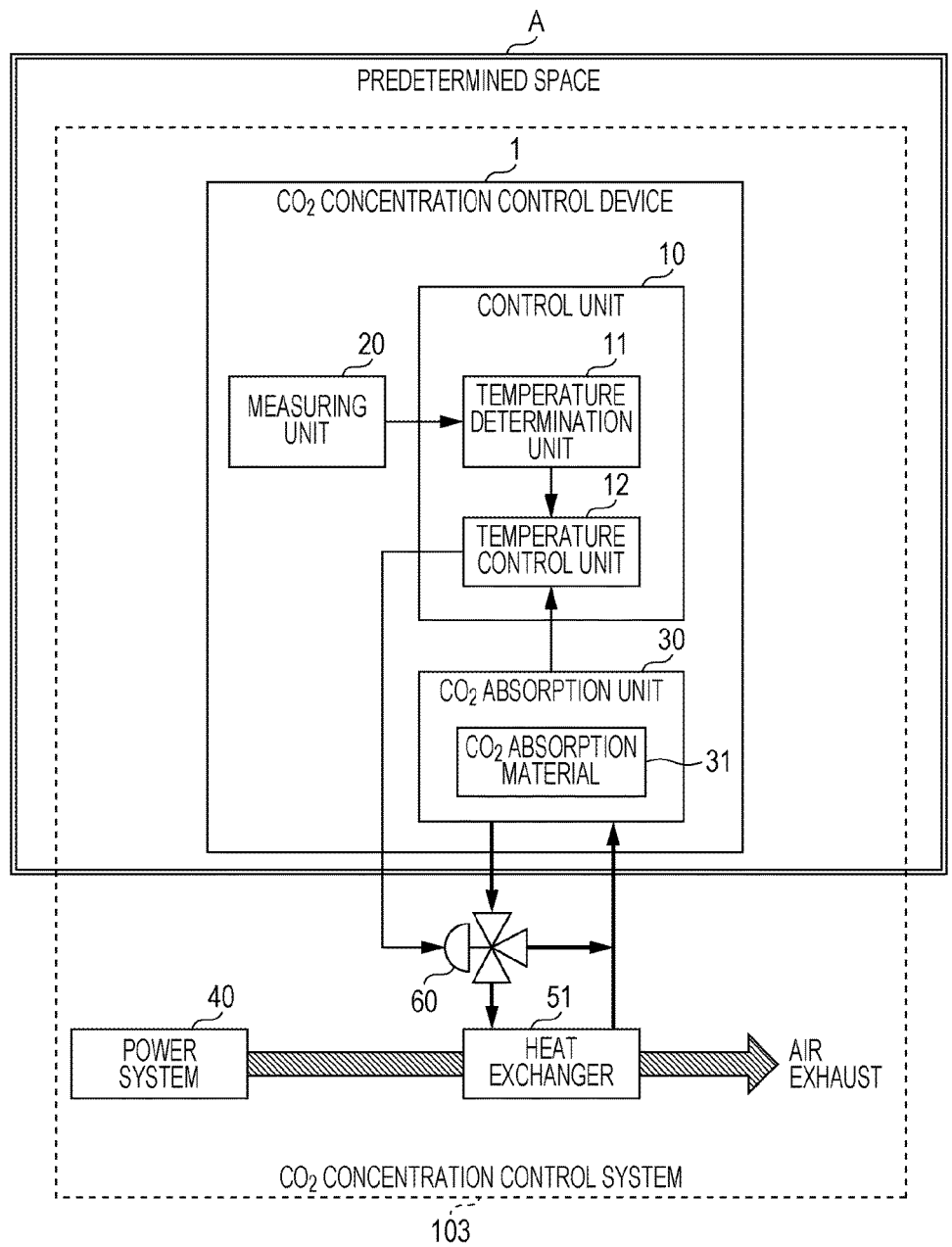
FIG. 11 is a diagram illustrating a configuration of a $CO_2$ concentration control system according to Embodiment 4 of the present invention.

A fourth embodiment according to the present invention will be described with reference to FIG. 11, as follows. FIG. 11 is a diagram illustrating a configuration of a $CO_2$ concentration control system 103 according to Embodiment 4 of the present invention. The $CO_2$ concentration control system 103 includes the flow rate control valve 60 and the flow path of a thermal medium, similar to the $CO_2$ concentration control system 100. In addition, the $CO_2$ concentration control system 103 includes the power system 40 which discharges an exhaust gas containing exhaust heat, and the heat exchanger 51 which penetrates the exhaust gas from the power system 40 and causes the thermal medium to acquire thermal energy of the exhaust gas.

In the $CO_2$ concentration control system 103, the flow rate control valve 60 determines the flow rate of a thermal medium supplied to the heat exchanger 51, and the flow rate of a thermal medium which is not supplied to the heat exchanger 51, in accordance with a control command of the temperature control unit 12. Thus, an amount of the thermal medium that absorbs heat in the heat exchanger 51 is controlled, and thus the temperature of the thermal medium flowing into the $CO_2$ absorption unit 30 is controlled. The thermal medium having the controlled temperature penetrates the $CO_2$ absorption unit 30, and thus the temperature of the $CO_2$ absorption material 31 is adjusted.

In this manner, the $CO_2$ concentration control system 103 adjusts the flow rate of the thermal medium by using the flow rate control valve 60, and thus can control the temperature of the $CO_2$ absorption material 31 fast and accurately.

Since the $CO_2$ concentration control system 103 can use heat of the exhaust gas which is a big cause of thermal loss in the power system, for controlling the temperature of the absorption material. Thus, it is possible to control the temperature of the $CO_2$ absorption material 31 more efficiently. Thus, the $CO_2$ concentration control system 103 can reduce consumed energy which relates to the temperature control, and reduce cost for the entirety of the system.

The carbon dioxide concentration control system includes the heat exchanger, and thus can prevent leakage of an exhaust gas into the predetermined space (for example, in a case of a vehicle, vehicle interior), and can safely use the heat of the exhaust gas.

Further, since the flow rate control valve 61 adjusts the flow rate of the exhaust gas in the configuration of the $CO_2$ concentration control system 102, pressure in the power system 40 may be changed when the flow rate is adjusted. The $CO_2$ concentration control system 103 has a configuration in which the flow rate of the thermal medium which acquires the heat quantity from the exhaust gas is adjusted instead of the exhaust gas even when the exhaust heat of the exhaust gas is used. Thus, it is possible to cause pressure change in the power system 40 to occur less frequently.

Embodiment 5

The configuration of the $CO_2$ concentration control system 102 and the configuration of the $CO_2$ concentration control system 103 may be combined. A $CO_2$ concentration control system 104 having a configuration of combining the $CO_2$ concentration control system 102 and the $CO_2$ concentration control system 103 will be described below with reference to FIG. 12.

Figure 12:
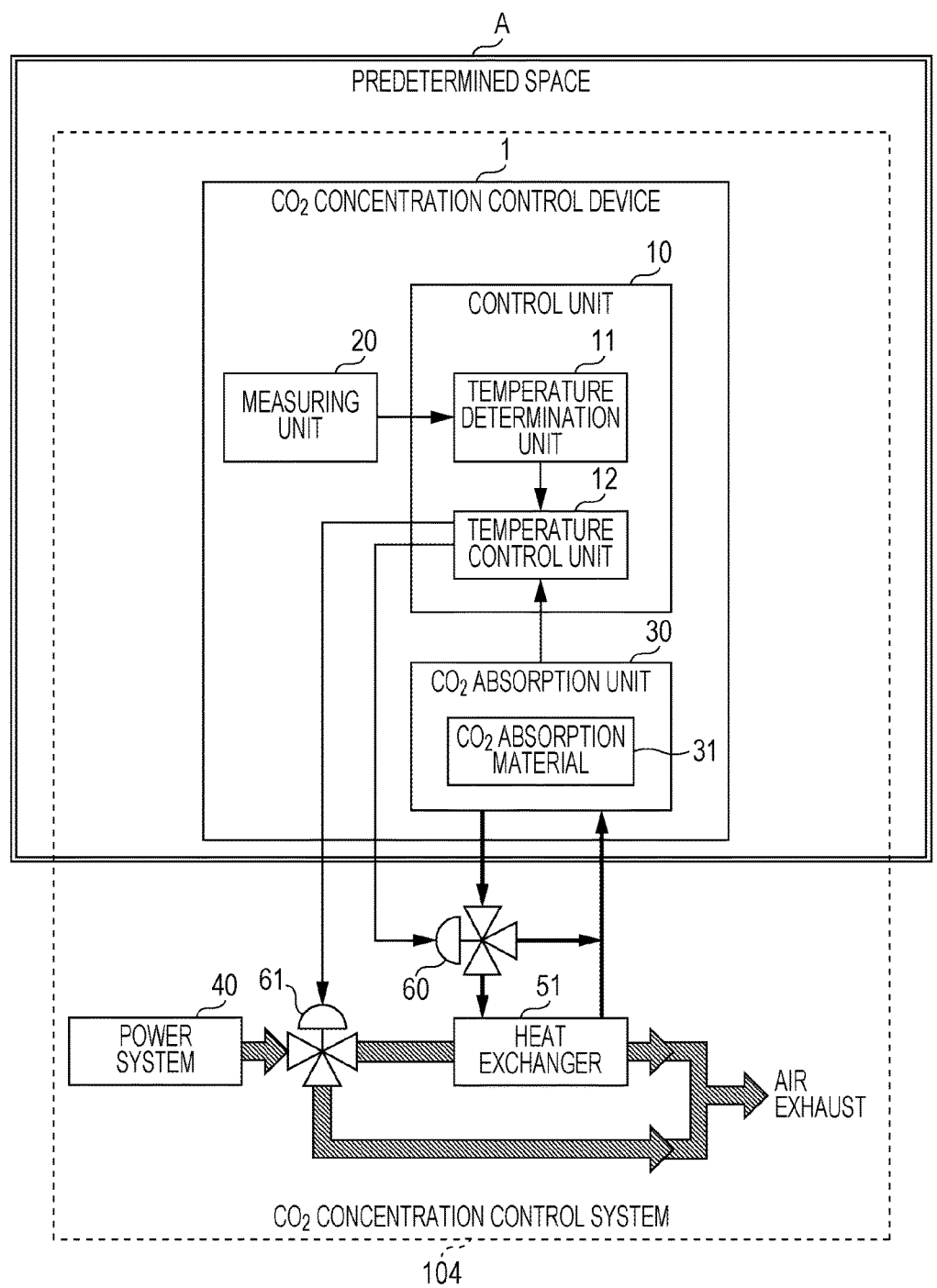
FIG. 12 is a diagram illustrating a configuration of a $CO_2$ concentration control system according to Embodiment 5 of the present invention.

FIG. 12 is a diagram illustrating a configuration of the $CO_2$ concentration control system 104 according to Embodiment 5 of the present invention. As illustrated in FIG. 12, the $CO_2$ concentration control system 104 includes both of the flow rate control valve 60 and the flow rate control valve 61. The flow rate control valve 60 adjusts a flow rate of a thermal medium into the heat exchanger 51, and the flow rate control valve 61 adjusts a flow rate of an exhaust gas into the heat exchanger 51, in accordance with a control command of the temperature control unit 12.

According to the above configuration, the temperature control unit 12 controls the flow rate control valve 60 and the flow rate control valve 61, in accordance with the setting temperature received from the temperature determination unit 11, and the measured temperature of the $CO_2$ absorption material 31 received from the $CO_2$ absorption unit 30. Thus, both of an amount of the thermal medium flowing into the heat exchanger 51 and an amount of the exhaust gas flowing into the heat exchanger 51 are controlled. Thus, an amount of the thermal medium which absorbs heat in the heat exchanger 51 and the heat quantity (temperature of the thermal medium) absorbed by the thermal medium are controlled. Accordingly, the thermal medium penetrates the $CO_2$ absorption unit 30, and thus the temperature of the $CO_2$ absorption material 31 is adjusted so as to be close to the setting temperature. In this manner, the $CO_2$ concentration control system 104 includes two flow rate control valves, and thus it is possible to control the temperature of the $CO_2$ absorption material 31 delicately and accurately.

Embodiment 6

The configuration of the $CO_2$ concentration control system 100 and the configuration of the $CO_2$ concentration control system 103 may be combined. A $CO_2$ concentration control system 105 having a configuration of combining the $CO_2$ concentration control system 100 and the $CO_2$ concentration control system 103 will be described below with reference to FIG. 13.

Figure 13:
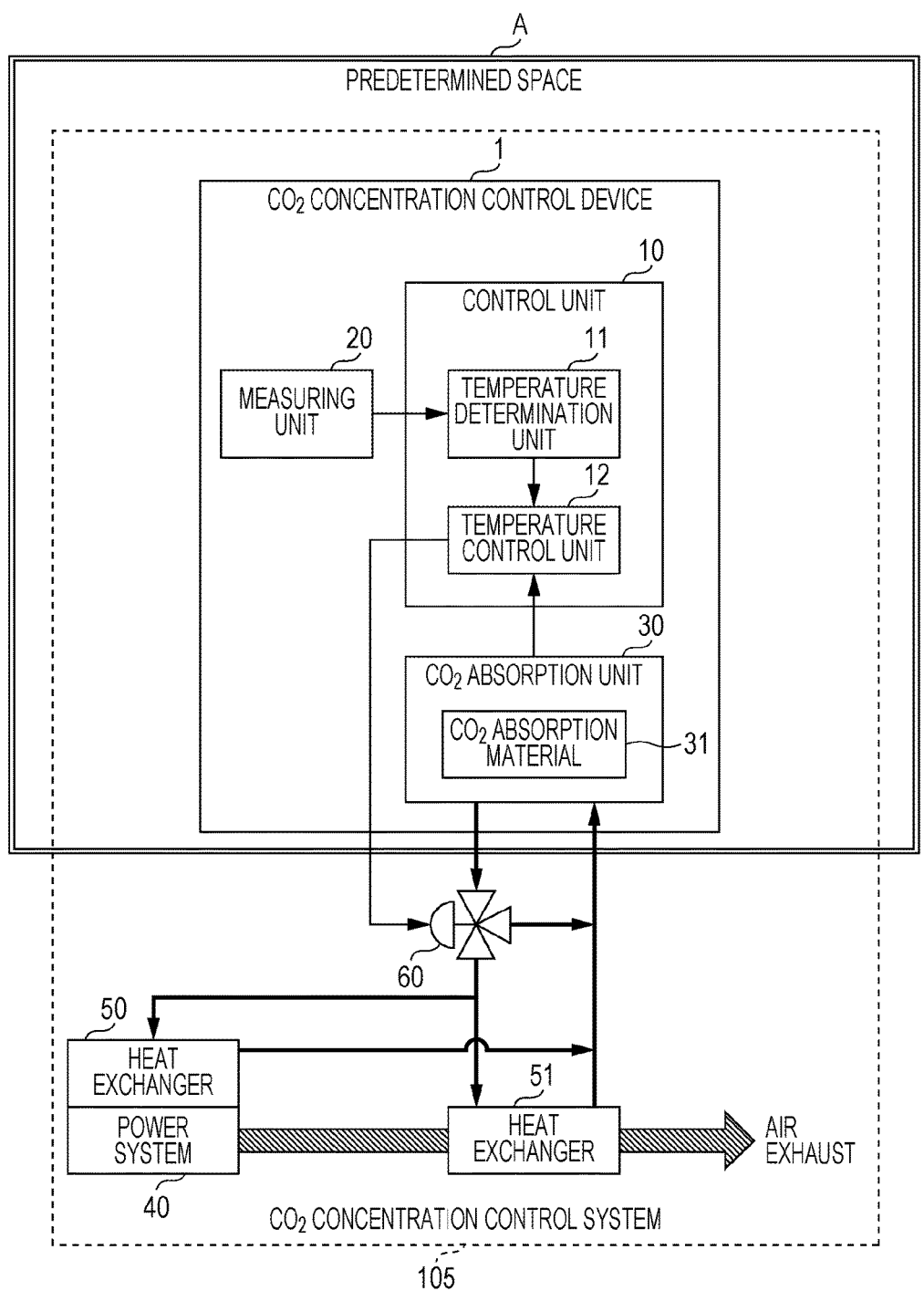
FIG. 13 is a diagram illustrating a configuration of a $CO_2$ concentration control system according to Embodiment 6 of the present invention.

FIG. 13 is a diagram illustrating a configuration of the $CO_2$ concentration control system 105 according to Embodiment 6 of the present invention. As illustrated in FIG. 13, the $CO_2$ concentration control system 105 includes the heat exchanger 50, the heat exchanger 51, and the flow rate control valve 60. The power system 40 in the $CO_2$ concentration control system 105 is a system which discharges an exhaust gas containing exhaust heat, and emits the exhaust heat from the system itself (or radiator and the like of the system).

The flow rate control valve 60 adjusts a flow rate of a thermal medium which is supplied to the heat exchanger 50 and the heat exchanger 51, and a flow rate of a thermal medium which is not supplied to the heat exchanger 50 and the heat exchanger 51, but directly flows into the $CO_2$ absorption unit 30, in accordance with a control of the temperature control unit 12.

The heat exchanger 50 is provided so as to be in contact with the power system 40 or to be close to the power system 40. The heat exchanger 50 causes the thermal medium flowing into the heat exchanger 50 to acquire exhaust heat emitted from the power system 40. The heat exchanger 51 transfers the exhaust heat contained in the exhaust gas which has been discharged from the power system 40, to the thermal medium which has flowed into the heat exchanger 51. The thermal medium which acquires heat in the heat exchanger 50 or the heat exchanger 51 flows into the $CO_2$ absorption unit 30 along any flow path.

In FIG. 13, a flow path on which the thermal medium flows into the heat exchanger 50, and a flow path on which the thermal medium flows into the heat exchanger 51 are simply obtained by just branching. Thus, the flow rate of the thermal medium into each of the heat exchangers is not adjusted. However, one flow rate control valve 60 may be provided at the branch point in the $CO_2$ concentration control system 105, and the flow rate of the thermal medium into the heat exchanger 50 and the flow rate of the thermal medium into the heat exchanger 51 may be adjusted by using the flow rate control valve 60.

According to the above configuration, the $CO_2$ concentration control device 1 can use a combination of both of the exhaust heat from the exhaust gas of the power system 40 and heat emitted from the power system 40 itself (for example, heat of a radiator), for controlling the temperature of the $CO_2$ absorption material 31. That is, the exhaust heat emitted from the power system 40 is more efficiently used, and thus the temperature of the $CO_2$ absorption material 31 can be controlled. Thus, it is possible to control the temperature of the $CO_2$ absorption material 31 fast and accurately.

Modification Example

The configuration of the $CO_2$ concentration control system 100 and the configuration of the $CO_2$ concentration control system 102 may be combined. The configuration of the $CO_2$ concentration control system 100 and the configuration of the $CO_2$ concentration control system 104 may be combined.

The carbon dioxide concentration control system according to the present invention may include a deodorizing air-conditioning filter, a formaldehyde-absorbing air-conditioning filter, an antibacterial/dust-collection air-conditioning filter, and a filter obtained by combining these filters. In this case, the air in the predetermined space A can be cleaned, and an air in which the carbon dioxide concentration is adjusted to be an appropriate value can be discharged. Thus, an effect in that the air in the predetermined space A becomes an air which is better for health, by a person is exhibited.

Further, it is desirable that the filter removes a substance (below referred to as a measuring obstruction) which inhibits measurement of the $CO_2$ concentration in the measuring unit 20 of each of the $CO_2$ concentration control systems 100 to 105. The measuring obstruction is, for example, dust and the like in an air. In this case, the measuring unit 20 in each of the $CO_2$ concentration control systems 100 to 105 measures the $CO_2$ concentration of an air in which the measuring obstruction is removed by the filter. Thus, an effect in that it is possible to detect the $CO_2$ concentration more accurately is exhibited.

In addition, it is possible to prevent deterioration of the next measuring accuracy occurring by adhering the measuring obstruction to the measuring unit 20 itself. Thus, the carbon dioxide concentration control system according to the present invention exhibits an effect in that it is possible to continuously control the carbon dioxide concentration in a space more accurately.

The $CO_2$ concentration control device 1 may further include a heating device such as a heater or a Peltier element. The $CO_2$ concentration control device 1 may control the temperature of the $CO_2$ absorption material 31 by using both of the exhaust heat from the power system 40 and heat applied in the heating device. In this case, as described above, the temperature determination unit 11 adjusts the distance between the power system 40 and the $CO_2$ absorption unit 30, or adjusts the flow rates of the flow rate control valves 60 and 61. The temperature determination unit 11 also controls heat applied to the $CO_2$ absorption material 31 (or the thermal medium) by the heating device. The heating device such as a heater or a Peltier element is relatively cheap. Thus, an effect in that it is possible to suppress manufacturing cost for the $CO_2$ concentration control device 1 and all of the $CO_2$ concentration control systems 100 to 105, and to control the temperature of the $CO_2$ absorption material 31 faster is exhibited.

Overview

According to a first aspect of the present invention, a carbon dioxide concentration control system ($CO_2$ concentration control system 100 to 105) includes a detection unit (measuring unit 20) that detects a carbon dioxide concentration in an air in a predetermined space (predetermined space A); an absorption unit ($CO_2$ absorption unit 30) that includes an absorption material ($CO_2$ absorption material 31) for absorbing carbon dioxide contained in the air, and can control a carbon dioxide absorption rate of the absorption material in accordance with the temperature of the absorption material; and an absorption rate control unit (control unit 10) that controls the temperature of the absorption material in accordance with the carbon dioxide concentration detected by the detection unit, so as to control the carbon dioxide absorption rate of the absorption material. The absorption rate control unit controls the temperature of the absorption material by using exhaust heat generated in a power system (power system 40) which is at least one of an energy source and a power source used in the predetermined space and/or in an object related to the predetermined space.

According to the configuration, the carbon dioxide concentration control device in the carbon dioxide concentration control system controls the temperature of the absorption material in accordance with the carbon dioxide concentration in the air in the predetermined space, so as to adjust the absorption rate of carbon dioxide of the absorption material.

Here, the carbon dioxide concentration control system controls the temperature of the absorption material by using the exhaust heat of the power system functioning as at least one of the energy source and the power source which are used in the predetermined space. Thus, the carbon dioxide concentration control system can control the temperature of the absorption material even though an energy source, a heat source, and the like for controlling the temperature of the absorption material are not separately provided.

Accordingly, in the carbon dioxide concentration control system, it is possible to reduce consumed energy which relates to control of the temperature of the absorption material per control of the carbon dioxide concentration. In the carbon dioxide concentration control system, it is possible to reduce the number of components constituting the system per the control of the carbon dioxide concentration. In other words, in the carbon dioxide concentration control system, it is possible to reduce cost for the entirety of the system.

According to a second aspect of the present invention, in the first aspect, in the carbon dioxide concentration control system, the predetermined space is preferably an interior of a transportation vehicle. The power system may be a system that generates at least one of energy and power for driving the transportation vehicle.

The transportation includes a device at a location which is close to the interior of the transportation (location close to the absorption material). The device generates energy and/or power for driving the transportation. Thus, the carbon dioxide concentration control system can use the exhaust heat of the power system in a state of small thermal loss, that is, with high energy use efficiency.

The device which generates energy and/or power for the transportation drives a space (transportation itself) in which a person stays, for the main purpose. Thus, the device generates energy larger than that in a device in which there is no need for driving a space in which a person exists, such as a power generator provided in a living space. Thus, thermal energy generated when the energy and/or the power are generated is also larger than that in the power generator and the like.

Accordingly, according to the above configuration, in the carbon dioxide concentration control system, it is possible to control the temperature of the absorption material more easily and faster by using the large thermal energy.

According to a third aspect of the present invention, in the second aspect, in the carbon dioxide concentration control system, the transportation may be a motor vehicle.

A vehicle has an interior narrower than that of a train or an air plane, and thus in the vehicle, an air is relatively efficiently circulated. Thus, according to the above configuration, the carbon dioxide concentration control device in the carbon dioxide concentration control system can more accurately control the carbon dioxide concentration in the air in the predetermined space. Since the interior of the vehicle is narrower than other transportations, it is possible to suppress an amount of the absorption material used in the carbon dioxide concentration control device. Accordingly, in the carbon dioxide concentration control system, it is possible to reduce cost for the entirety of the system.

According to a fourth aspect of the present invention, in any one of the first to third aspects, in the carbon dioxide concentration control system, the power system may discharge exhaust gas with exhaust heat. The system may further include a heat exchanger (heat exchanger 51) that heats a thermal medium by using heat of the exhaust gas discharged by the power system. The absorption rate control unit may control the temperature of the absorption material by using heat of the thermal medium heated by the heat exchanger.

According to the above configuration, in the carbon dioxide concentration control system, it is possible to control the temperature of the absorption material by using the heat of the exhaust gas which is a big cause of thermal loss in the power system. Thus, in the carbon dioxide concentration control system, it is possible to control the temperature of the absorption material more efficiently. In the carbon dioxide concentration control system, it is possible to reduce consumed energy which relates to the temperature control, and to reduce cost for the entirety of the system.

The carbon dioxide concentration control system includes the heat exchanger, and thus can prevent leakage of an exhaust gas into the predetermined space (for example, in a case of a vehicle, vehicle interior), and can safely use the heat of the exhaust gas.

According to a fifth aspect of the present invention, a carbon dioxide concentration control device ($CO_2$ concentration control device 1) includes a detection unit (measuring unit 20) that detects a carbon dioxide concentration in an air in a predetermined space (predetermined space A); an absorption unit ($CO_2$ absorption unit 30) that includes an absorption material ($CO_2$ absorption material 31) for absorbing carbon dioxide contained in the air, and can control a carbon dioxide absorption rate of the absorption material in accordance with a temperature of the absorption material; and an absorption rate control unit (control unit 10) that controls the temperature of the absorption material in accordance with the carbon dioxide concentration detected by the detection unit, so as to control the carbon dioxide absorption rate of the absorption material. The absorption rate control unit controls the temperature of the absorption material by using exhaust heat generated in a power system (power system 40).

According to the above configuration, in the carbon dioxide concentration control device, an effect similar to that in the carbon dioxide concentration control system according to the first aspect of the present invention is exhibited.

According to a sixth aspect of the present invention, in any one of the first to third aspects, in the carbon dioxide concentration control system, the power system and the absorption unit may be provided so as to be in contact with each other or be close to each other. The absorption rate control unit may control the distance between the power system and the absorption unit, and thus may control the temperature of the absorption material.

According to the above configuration, in the carbon dioxide concentration control system, the distance between the power system and the absorption unit is controlled, and thus it is possible to simply adjust the heat quantity which is acquired from the power system by the absorption material. Thus, in the carbon dioxide concentration control system, it is possible to simply control the temperature of the absorption material.

According to a seventh aspect of the present invention, in any one of the first to third aspects, the carbon dioxide concentration control system may further include a second heat exchanger (heat exchanger 50) that heats the thermal medium by using thermal energy of the exhaust heat which is generated in the power system. The absorption rate control unit may control the temperature of the absorption material by using heat of the thermal medium heated by the second heat exchanger.

According to the above configuration, in the carbon dioxide concentration control system, thermal energy of the exhaust heat which is generated in the power system is transferred to the thermal medium, and it is possible to control the temperature of the absorption material by using the thermal energy.

Thus, in the carbon dioxide concentration control system, it is possible to control the temperature of the absorption material with low consumed energy, by using the exhaust heat.

According to an eighth aspect of the present invention, in the seventh aspect, in the carbon dioxide concentration control system, a first flow path for circulating the thermal medium may be provided between the second heat exchanger and the absorption material. The absorption rate control unit may control the temperature of the absorption material by using the thermal medium which circulates on the first flow path.

According to the above configuration, in the carbon dioxide concentration control system, the thermal medium is circulated between the second heat exchanger and the absorption material, and thus the exhaust heat can be transferred to the thermal medium by the second heat exchanger. In addition, it is possible to control (heat) the temperature of the absorption material by using the transferred exhaust heat. Thus, the thermal medium after penetrating the absorption material can be heated again by the second heat exchanger.

Thus, in the carbon dioxide concentration control system, it is possible to control the temperature of the absorption material with lower consumed energy, by using the exhaust heat.

According to a ninth aspect of the present invention, in the eighth aspect, in the carbon dioxide concentration control system, the first flow path may include a second flow path for guiding the thermal medium which has penetrated the absorption material, to the second heat exchanger, and a third flow path for guiding the thermal medium which has penetrated the absorption material, to the absorption material again. The carbon dioxide concentration control system may include a first flow rate control valve (flow rate control valve 60) that adjusts the flow rate of the thermal medium into each of the second flow path and the third flow path. The absorption rate control unit may control the first flow rate control valve to adjust the flow rate of the thermal medium into the second flow path and the third flow path, and thus may control the temperature of the absorption material.

According to the above configuration, in the carbon dioxide concentration control system, it is possible to control an amount of the thermal medium which absorbs heat in the second heat exchanger. The thermal medium which absorbs heat and the thermal medium which does not absorb heat are mixed, and the mixture penetrates the absorption material. Thus, the temperature of the absorption material is adjusted. Thus, it is possible to control the temperature of the absorption material fast and accurately.

According to a tenth aspect of the present invention, in any one of the seventh to ninth aspects, the carbon dioxide concentration control system may include a temperature sensor that measures the temperature of the thermal medium flowing into the absorption material. The absorption rate control unit may control the temperature of the absorption material in accordance with the carbon dioxide concentration measured by the measuring unit, and the temperature of the thermal medium measured by the temperature sensor.

According to the above configuration, in the carbon dioxide concentration control system, it is possible to monitor the temperature of the thermal medium. Since the temperature of the absorption material can be more accurately predicted based on the temperature of the thermal medium, it is possible to control the temperature of the absorption material more accurately.

According to an 11th aspect of the present invention, in the fourth aspect, the carbon dioxide concentration control system may include a fourth flow path for circulating the thermal medium between the heat exchanger (heat exchanger 51) and the absorption material. The absorption rate control unit may control the temperature of the absorption material by using the thermal medium which circulates on the fourth flow path.

According to the above configuration, in the carbon dioxide concentration control system, the thermal medium can be circulated between the heat exchanger and the absorption material, and thus the exhaust heat contained in the exhaust gas can be transferred to the thermal medium in the heat exchanger. The temperature of the absorption material can be controlled (heated) by using the transferred heat, and the thermal medium after penetrating the absorption material can be heated again in the heat exchanger.

Thus, in the carbon dioxide concentration control system, it is possible to control the temperature of the absorption material with lower consumed energy, by using the exhaust heat.

According to a 12th aspect of the present invention, in the 11th aspect, in the carbon dioxide concentration control system, the fourth flow path may include a third flow rate control valve (flow rate control valve 60) which includes a fifth flow path for guiding the thermal medium which has penetrated the absorption material, to the heat exchanger, and a sixth flow path for guiding the thermal medium which has penetrated the absorption material, to the absorption material again. The carbon dioxide concentration control system may include a third flow rate control valve which adjust the flow rate of the thermal medium into each of the fifth flow path and the sixth flow path. The absorption rate control unit may control the third flow rate control valve to adjust the flow rate of the thermal medium into each of the fifth flow path and the sixth flow path, and thus may control the temperature of the absorption material.

According to the above configuration, in the carbon dioxide concentration control system, it is possible to adjust an amount of the thermal medium which absorbs heat in the heat exchanger. The thermal medium which absorbs heat and the thermal medium which does not absorb heat are mixed, and the mixture penetrates the absorption material. Thus, the temperature of the absorption material is adjusted. Thus, it is possible to control the temperature of the absorption material fast and accurately.

Further, the carbon dioxide concentration control system has a configuration in which the flow rate of the thermal medium which acquires the heat quantity from the exhaust gas is adjusted instead of the exhaust gas even when the exhaust heat of the exhaust gas is used. Thus, it is possible to cause pressure change in the power system to occur less frequently.

According to a 13th aspect of the present invention, in the 11th aspect or the 12th aspect, the carbon dioxide concentration control system may include a fourth flow rate control valve (flow rate control valve 61) which adjusts the flow rate of the exhaust gas which has been discharged by the power system and flows into the heat exchanger. The absorption rate control unit may control the fourth flow rate control valve to adjust the flow rate of the exhaust gas, and thus may control the temperature of the thermal medium.

According to the above configuration, in the carbon dioxide concentration control system, an amount of the exhaust gas flowing into the heat exchanger is adjusted by using the fourth flow rate control valve. Thus, it is possible to adjust the heat quantity absorbed from the exhaust gas by the thermal medium. Thus, it is possible to control the temperature of the absorption material fast and accurately.

The present invention is not limited to the above-described embodiments, and various modifications may be made in a range represented by Claims. Technical means disclosed in each of the different embodiments may be appropriately combined, thereby an embodiment may be obtained, and this embodiment may be included in the technical scope of the present invention. Further, technical means disclosed in each of the different embodiments may be appropriately combined, and thus new technical features may be obtained.

INDUSTRIAL APPLICABILITY

The present invention can be properly used in a carbon dioxide concentration control system of controlling a carbon dioxide concentration.

REFERENCE SIGNS LIST

1 $CO_2$ Concentration Control Device (Carbon Dioxide Concentration Control Device)
10 Control Unit (Absorption Rate Control Unit)
11 Temperature Determination Unit
12 Temperature Control Unit
20 Measuring Unit (Detection Unit)
30 $CO_2$ Absorption Unit (Absorption Unit)
31 $CO_2$ Absorption Material (Absorption Material)
40 Power System
50, 51 Heat Exchanger
60 Flow Rate Control Valve
100 To 105 $CO_2$ Concentration Control System (Carbon Dioxide Concentration Control System)
A Predetermined Space

The invention claimed is:

1. A carbon dioxide concentration control system, comprising:
   a detection unit that detects a carbon dioxide concentration in an air in a predetermined space;
   an absorption unit that includes an absorption material for absorbing carbon dioxide contained in the air and is configured to enable control of a carbon dioxide absorption rate of the absorption material in accordance with a temperature of the absorption material; and
   an absorption rate control unit that controls the temperature of the absorption material in accordance with the carbon dioxide concentration detected by the detection unit so as to control the carbon dioxide absorption rate of the absorption material,
   wherein the absorption rate control unit controls the temperature of the absorption material by using exhaust heat generated in a power system which is at least one of an energy source and a power source used in at least one of the predetermined space and an object related to the predetermined space.

2. The carbon dioxide concentration control system according to claim 1,
   wherein the predetermined space is interior of a transportation vehicle, and
   the power system is a system that generates at least one of energy and power for driving the transportation vehicle.

3. The carbon dioxide concentration control system according to claim 2, wherein the transportation is a motor vehicle.

4. The carbon dioxide concentration control system according to claim 1, in which the power system discharges exhaust gas with exhaust heat, the system further comprising:
   a heat exchanger that heats a thermal medium by using heat of the exhaust gas discharged by the power system,
   wherein the absorption rate control unit controls the temperature of the absorption material by using heat of the thermal medium heated by the heat exchanger.

5. A carbon dioxide concentration control device, comprising:
   a detection unit that detects a carbon dioxide concentration in an air in a predetermined space;
   an absorption unit that includes an absorption material for absorbing carbon dioxide contained in the air and is configured to enable control of a carbon dioxide absorption rate of the absorption material in accordance with a temperature of the absorption material; and
   an absorption rate control unit that controls the temperature of the absorption material in accordance with the carbon dioxide concentration detected by the detection unit so as to control the carbon dioxide absorption rate of the absorption material,
   wherever the absorption rate control unit controls the temperature of the absorption material by using exhaust heat generated in a power system.

* * * * *